US012280898B2

(12) United States Patent
Thenander et al.

(10) Patent No.: US 12,280,898 B2
(45) Date of Patent: Apr. 22, 2025

(54) SEPARABLE CLAMPED HDRM INTERFACE FOR MANAGING TORSION LOADS

(71) Applicant: BEYOND GRAVITY SWEDEN AB, Gothenburg (SE)

(72) Inventors: Magnus Thenander, Linköping (SE); Niklas Journath, Norrköping (SE); Kjell Pettersson, Linköping (SE); Oskar Björfeldt, Linköping (SE)

(73) Assignee: Beyond Gravity Sweden AB, Gothenburg (SE)

( * ) Notice: Subject to any disclaimer, the term of this patent is extended or adjusted under 35 U.S.C. 154(b) by 67 days.

(21) Appl. No.: 17/981,555

(22) Filed: Nov. 7, 2022

(65) Prior Publication Data

US 2023/0140889 A1    May 11, 2023

(30) Foreign Application Priority Data

Nov. 10, 2021  (EP) .................................... 21207532

(51) Int. Cl.
*B64G 1/64* (2006.01)
(52) U.S. Cl.
CPC .............. *B64G 1/645* (2013.01); *B64G 1/643* (2023.08)
(58) Field of Classification Search
CPC ........ B64G 1/645; B64G 1/643; B64G 1/641; B64G 1/222; B64G 1/10; B64G 1/646;
(Continued)

(56) References Cited

U.S. PATENT DOCUMENTS 5,018,901 A * 5/1991 Ferree .................... B64G 1/641
403/349
8,651,765 B2 * 2/2014 Plaza Baonza ........ B64G 1/222
403/322.3
(Continued)

FOREIGN PATENT DOCUMENTS

CN      208570892 U     3/2019
WO      2019/223984 A1  11/2019

OTHER PUBLICATIONS

Extended European Search Report mailed Apr. 12, 2022 for European Application No. 21207532.9, 8 pages.

*Primary Examiner* — Medhat Badawi
*Assistant Examiner* — Vicente Rodriguez
(74) *Attorney, Agent, or Firm* — Sage Patent Group

(57) ABSTRACT

A Hold Down Release Mechanism, HDRM, interface for attachment of a spacecraft to an adjacent structure of a launch vehicle or another spacecraft, wherein the HDRM interface is configured for forming part of a single or multi-point releasable attachment of the spacecraft to said adjacent structure. The HDRM interface includes first and second connector parts, wherein one of the first and second connector parts is fastened to said adjacent structure, and other is fastened to the spacecraft; wherein the first connector part has a tapered projection with a non-circular external surface; wherein the second connector part has a tapered recess with a non-circular interior surface configured for form-lockingly receiving the tapered projection, for enabling transfer of torsion and shear load between the first and second connector parts, when the tapered projection is inserted in the tapered recess and the first and second connector parts are pressed together.

13 Claims, 10 Drawing Sheets

(58) Field of Classification Search
CPC ........ F16B 2/14; F16B 2200/63; F16B 21/12; F16B 21/10
See application file for complete search history.

(56) References Cited

U.S. PATENT DOCUMENTS

| | | | |
|---|---|---|---|
| 9,957,045 B1* | 5/2018 | Daly | B64U 50/19 |
| 11,225,340 B2* | 1/2022 | Medina | F16B 5/08 |
| 11,345,489 B2* | 5/2022 | Aston | B64G 1/641 |
| 11,577,861 B1* | 2/2023 | Baghdasarian | B64G 1/645 |
| 11,827,384 B2* | 11/2023 | Panetti | B64G 1/1085 |
| 2011/0113605 A1 | 5/2011 | Plaza Baonza | |
| 2018/0111707 A1* | 4/2018 | Poncet | B64G 1/641 |
| 2020/0071005 A1 | 3/2020 | Medina et al. | |
| 2021/0086918 A1 | 3/2021 | Weintraub et al. | |

* cited by examiner

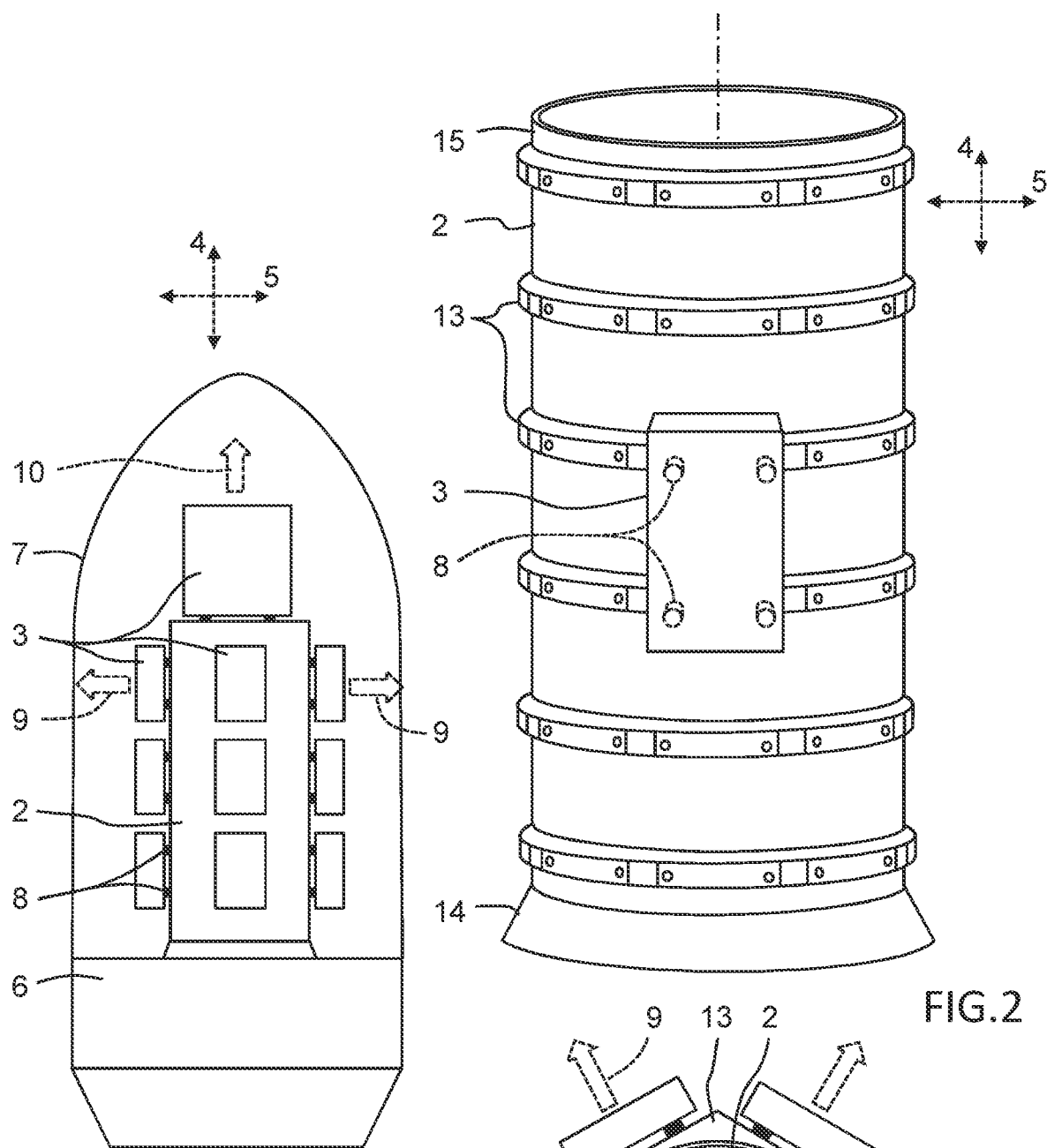
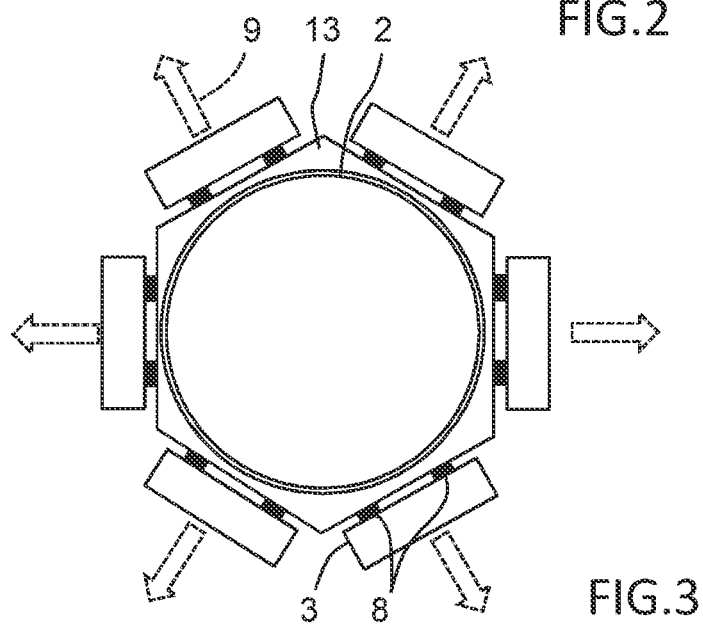
FIG.1
FIG.2
FIG.3

A-A

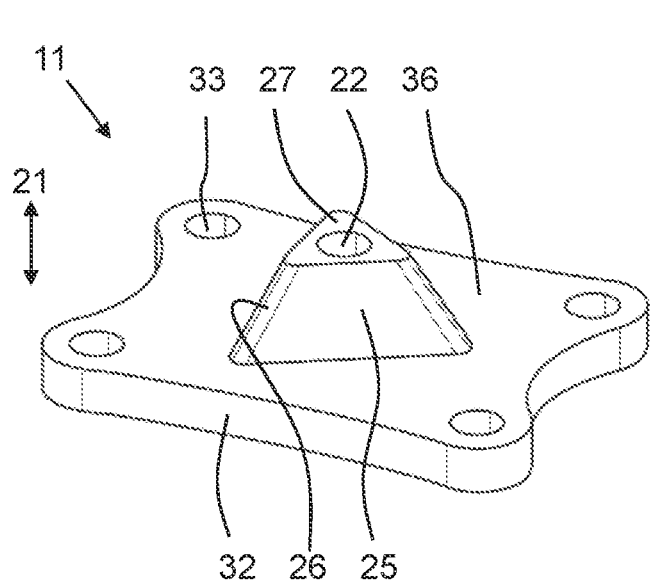
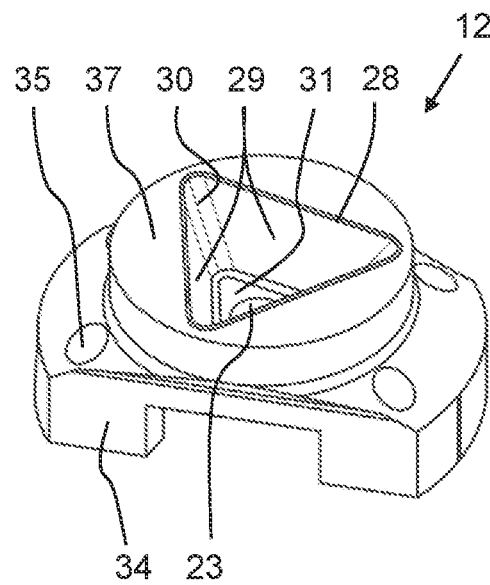
FIG.7A
FIG.7B
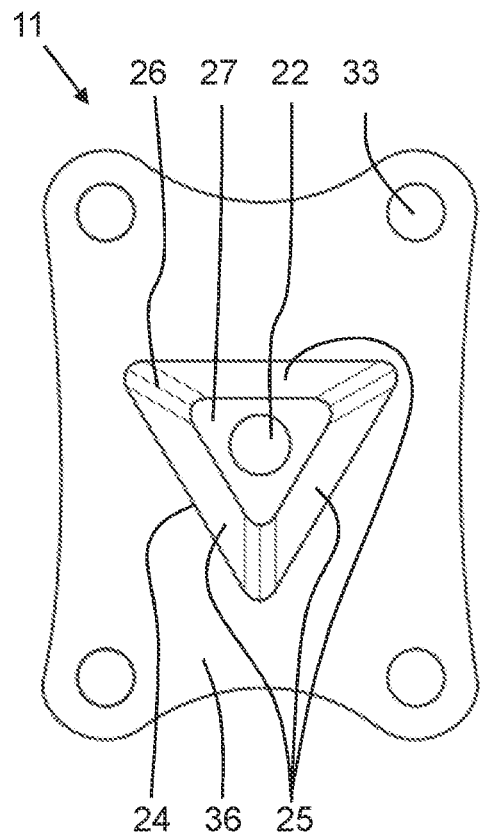
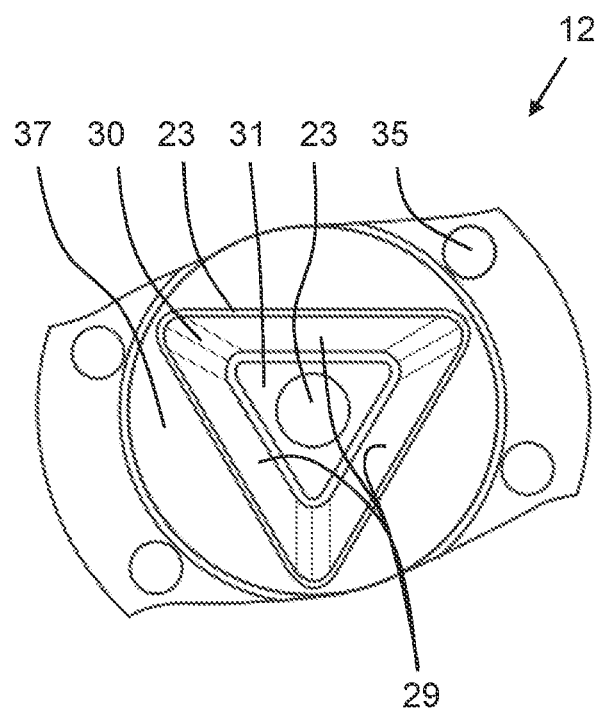
FIG.8A
FIG.8B

B-B

B-B

B-B

B-B

B-B

B-B

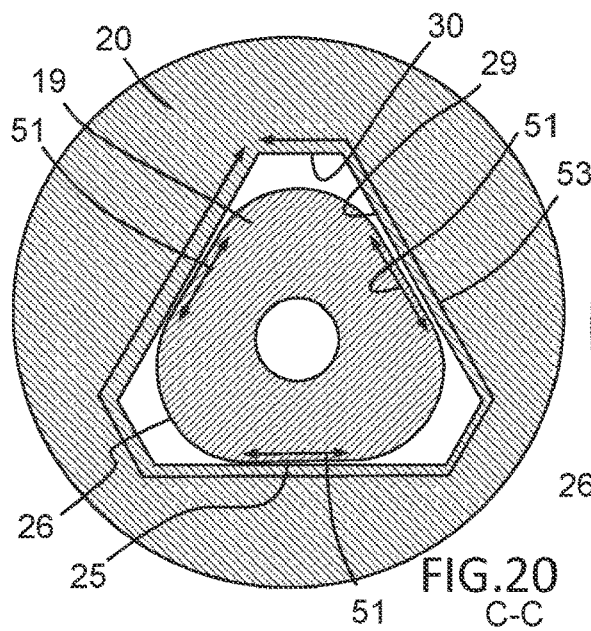
FIG.20 C-C
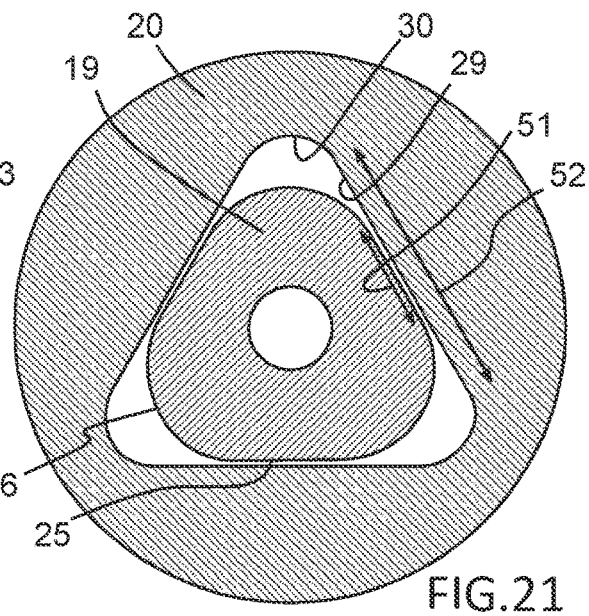
FIG.21 C-C
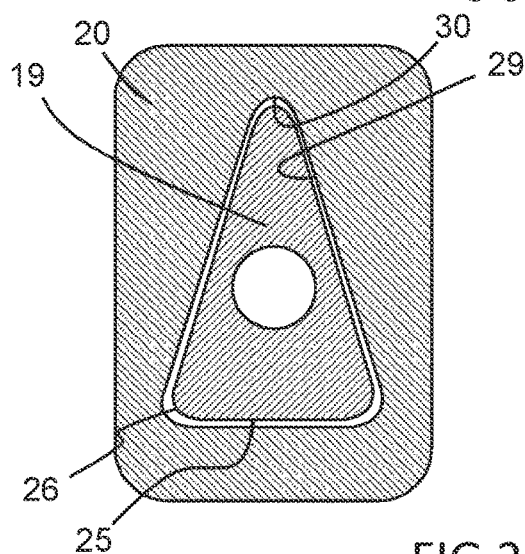
FIG.22 C-C
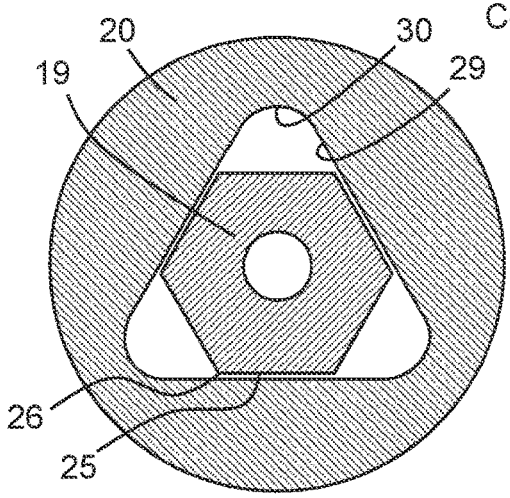
FIG.23 C-C
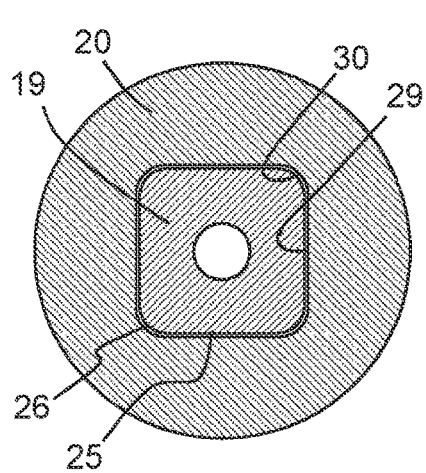
FIG.24 C-C
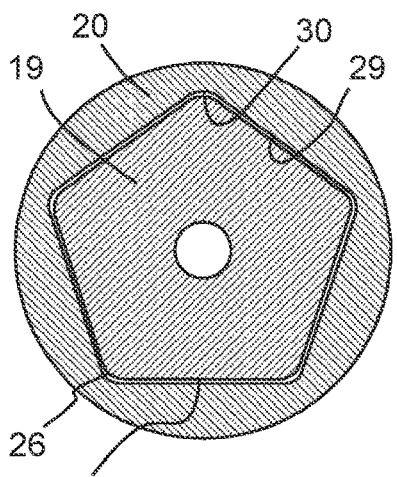
FIG.25 C-C
FIG.26

SEPARABLE CLAMPED HDRM INTERFACE FOR MANAGING TORSION LOADS

CROSS-REFERENCE TO RELATED APPLICATIONS

The present application for patent claims priority to EP Application No. EP21207532.9 entitled "A SEPARABLE CLAMPED HDRM INTERFACE FOR MANAGING TORSION LOADS" filed on Nov. 10, 2021, assigned to the assignee hereof, and expressly incorporated herein by reference.

TECHNICAL FIELD

The present disclosure relates to a Hold Down Release Mechanism, HDRM, interface, as well as a method for mounting a spacecraft to an adjacent structure of a launch vehicle or of another spacecraft using a singular or plurality of HDRM interfaces.

The HDRM interface according to the disclosure can be arranged for releasably attaching a spacecraft, such as a satellite or spaceship to a launch vehicle, such as a rocket or high altitude airplane.

The HDRM interface comprises first and second connector parts that are arranged to be separated on command, for example via pyrotechnical separation bolt or the like.

BACKGROUND

A carrier rocket may be used as a launch vehicle for transporting one or more spacecrafts, such as satellites or payloads, into space. The carrier rocket typically consists of several engine stages, which one at a time propel the rocket so as to carry it to an orbital point where the satellite is separated from the carrier rocket. During launching, when one rocket carrier engine stage is expended the next one takes over, whereupon the part of the carrier rocket comprising the expended engine stage detaches from the rest of the carrier rocket.

A spacecraft carrier structure, such as for example a dispenser structure or an adapter structure, is typically mounted above the engine stage, which powers the carrier rocket the final part of its path towards the orbital point where the spacecraft is to be detached. The dispenser/adapter structure have for example the shape of a hollow cylinder or a straight truncated, circular cone, or the like. The dispenser/adapter structure acts as an interface between the carrier rocket and spacecraft and the spacecraft is attached to the dispenser/adapter structure by means of a singular or plurality of individual releasable connections, known as Hold Down Release Mechanism, HDRM, interfaces. A HDRM interface comprises first and second connector parts that are clamped together by a release bolt or the like, for example a pyrotechnical release bolt.

During spacecraft separation, a release bolt of the HDRM interface is activated, whereby the first and second connector parts of the each HDRM interface becomes disconnected substantially simultaneously, and the spacecraft becomes separated from the dispenser/adapter structure.

One example design of a cup and cone multi-point HDRM interface is known from document US 2011/113605 A1.

However, in the field of HDRM interfaces for single-point or multi-point releasably attachment of a spacecraft to the dispenser/adapter structure, there is a continuous demand for further improved HDRM interfaces in terms of various operating parameters, such as robustness, reliability, low weight, manufacturing cost, play-free connection and force transfer capability.

SUMMARY

An object of the present disclosure is to provide a separable clamped interface with improved management of torsion loads. The interface may be referred to as a Hold Down Release Mechanism, HDRM, interface. A further object of the present disclosure is to provide a method for mounting a spacecraft to an adjacent structure of a launch vehicle or of another spacecraft using a singular or plurality of HDRM interfaces with improved management of torsion loads. This object is at least partly achieved by the features of the independent claims.

According to a first aspect of the present disclosure, there is provided a Hold Down Release Mechanism, HDRM, interface for attachment of a spacecraft to an adjacent structure of a launch vehicle or of another spacecraft, wherein the HDRM interface is configured for forming part of a single-point or multi-point releasable attachment of the spacecraft to said adjacent structure. The HDRM interface comprising a first connector part and a second connector part, wherein one of the first and second parts is configured to be fastened to said adjacent structure, and the other of the first and second parts is configured to be fastened to the spacecraft, wherein the first connector part has a tapered projection with a non-circular external surface, wherein the second connector part has a matching formed tapered recess with a non-circular interior surface configured for form-lockingly receiving the tapered projection, for enabling transfer of at least torsion load and shear load between the first and second connector parts, when the projection is inserted in the recess and the first and second connector parts are pressed together, and wherein both the tapered projection of the first connector part and the tapered recess of the second connector part have a central through-hole for receiving a release bolt configured to clamp the first and second connector parts together.

According to a second aspect of the present disclosure, there is provided a method for mounting a spacecraft to an adjacent structure of a launch vehicle or of another spacecraft using a singular or plurality of Hold Down Release Mechanism, HDRM, interfaces forming part of a single-point or multi-point attachment of the spacecraft to said adjacent structure. The method comprising: providing a singular or plurality of HDRM interfaces, each having a first connector part having a tapered projection with a non-circular external surface and a central through-hole, and a second connector part having a matching formed tapered recess with a non-circular interior surface configured for form-lockingly receiving the tapered projection, for enabling transfer of at least torsion load and shear load between the first and second connector parts, when the projection is inserted in the recess and the first and second connector parts are pressed together, wherein also the second connector part has central through-hole; providing a singular or plurality of release bolts and inserting a release bolt through the central through hole of the first and second connector parts of each of the singular or plurality of HDRM interfaces and clamping the first and second connector parts together by means of said release bolt to form a singular or plurality of assembled HDRM interfaces; and attaching one of the first and second parts of the singular or plurality of HDRM interfaces to said adjacent structure and attaching the spacecraft to the other of the first and second parts of the singular or plurality of HDRM interfaces.

Prior art multi-point HDRM interface solutions known as cup & cone design generally includes first and second connectors parts having the shape of a cup and a cone, respectively, that are circular symmetric for enabling simplified mounting and assembly and for enabling transfer shear loads over the connector parts while cancelling rotational stiffness.

However, it has been determined that, even if the conventional cup and cone interface provides excellent shear load transfer capability, the lack of rotational support of the conventional cup and cone design may be undesirable in certain implementations, such as for example when carrying spacecrafts having relatively low internal structural stability, because these types of spacecrafts may then be structurally damaged when being exposed to high torsional loads.

The HDRM interface according to the disclosure solves this problem by combining the excellent shear load transfer capability of the cup and cone interface with torsional load transfer capability, thereby supporting the spacecraft against structural damages caused by torsional loads acting on the spacecraft, especially in the region adjacent the HDRM interface.

In other words, the HDRM interface according to the disclosure solves the problem by providing a form-locking structure between the first and second connector parts that is able to transfer a torsion load over the joint and still allow for a reliable separation.

It has come to the inventor's knowledge that such needs exists, since some spacecraft are designed such that they generate a relatively high, and possibly damaging, torsion load at the separable interface joint, and that such relatively high torsion load cannot be transferred with a classical cylindrical cup and cone interface.

It has also come to the inventor's knowledge that merely providing the conventional circular cup and cone interface with serrated plates or similar type of rotational-locking means at flat surfaces arranged in a plane perpendicular to an intended release direction, i.e. displaced from the lateral cup and cone surface, generally results in rotational play between the cup and cone interface due to the difficulty in manufacturing such an cup and cone interface. Specifically, it has been found that it particularly difficult to provide a play-free connection between the conventional circular cup and cone interface while simultaneously providing a play-free connection between the rotational-locking plates of the first and second connector parts.

These problems are at least partly solved by the HDRM interface according to the disclosure, by providing the HDRM interface with first connector part having a tapered projection with a non-circular external surface and the second connector part with a matching formed tapered recess with a non-circular interior surface configured for form-lockingly receiving the tapered projection, for enabling play-free transfer of at least torsion load and shear load between the first and second connector parts.

The problems of the prior art cup and cone interface solutions, such as play-free torsional locking, highly complex interface with difficult and costly manufacturing, challenges in the many tolerances at the interface, increased part count, and/or increased cost and weight, are thus at least partly overcome.

Further advantages are achieved by implementing one or several of the features of the dependent claims.

In some example embodiments, a lateral surface area of the tapered projection of the first connector part is defined by a set of substantially flat lateral sides, specifically an odd number of lateral sides, and more specifically three lateral sides, mutually connected via sharp or rounded or bevelled lateral edges, i.e. corner regions, and wherein a lateral surface area of the tapered recess of the second connector part is defined by a set of substantially flat lateral sides, specifically an odd number of lateral sides, and more specifically three lateral sides, mutually connected via sharp or rounded or bevelled lateral edges, i.e. corner regions. Insert advantages here and below.

In some example embodiments, that may be combined with any one or more of the above-described embodiments, the tapered projection of the first connector part has a shape of truncated or non-truncated pyramid with odd number of main lateral sides, and the tapered recess of the second connector part has the shape of an inverse truncated or non-truncated pyramid with odd number of main lateral sides.

The pyramid shape enables transfer of both torsion and shear loads and has no play in the mounted state due to the three-sided configuration. A four-sided pyramid would generally not provide similarly play-free connection due to manufacturing tolerance outcome and the over-determined design.

In some example embodiments, that may be combined with any one or more of the above-described embodiments, the tapered projection of the first connector part has the shape of a truncated or non-truncated substantially triangular pyramid, and the tapered recess of the second connector part has the shape of a truncated or non-truncated inverse substantially triangular pyramid.

In some example embodiments, that may be combined with any one or more of the above-described embodiments, the tapered projection of the first connector part has the shape of a truncated triangular pyramid, and the tapered recess of the second connector part has the shape of a truncated inverse triangular pyramid.

In some example embodiments, that may be combined with any one or more of the above-described embodiments, an exterior outline of a cross-section of the tapered projection of the first connector part, in a plane perpendicular to a release direction of the HDRM interface, has three substantially straight lateral sides that are mutually connected by sharp or rounded and/or bevelled lateral edges, i.e. corners.

In some example embodiments, that may be combined with any one or more of the above-described embodiments, an exterior outline of a cross-section of the tapered recess of the second connector part, in a plane perpendicular to a release direction of the HDRM interface, has three substantially straight lateral sides that are mutually connected by rounded and/or bevelled lateral edges, i.e. corners.

In some example embodiments, that may be combined with any one or more of the above-described embodiments, an exterior outline of a cross-section of the tapered projection of the first connector part, in a plane perpendicular to a release direction of the HDRM interface, has three substantially straight sides with substantially equal length.

In some example embodiments, that may be combined with any one or more of the above-described embodiments, an effective minimal contact length of a straight side of an exterior outline of a cross-section of the tapered projection of the first connector part, in a plane perpendicular to a release direction of the HDRM interface, is at least 50%, specifically at least 75%, and more specifically at least 90%, of a length of oppositely facing straight side of the tapered recess of the second connector part, in said plane. A high level of contact length provides improved coupling and force-transfer between the first and second connector parts.

In some example embodiments, that may be combined with any one or more of the above-described embodiments, an effective minimal total contact length of an exterior outline of a cross-section of the tapered projection of the first connector part, in a plane perpendicular to a release direction of the HDRM interface, is at least 50%, specifically at least 75%, and more specifically at least 90%, of a length of oppositely facing interior outline of a cross-section of the tapered recess of the second connector part, in said plane. A high level of contact length provides improved coupling and force-transfer between the first and second connector parts.

In some example embodiments, that may be combined with any one or more of the above-described embodiments, an exterior surface of a flat side of the tapered projection of the first connector part define a tapering angle, relative to a release direction of the HDRM interface, in the range of 5-45°, specifically in the range of 10-30°. This tapering angle generally provides high level of shear transfer capability while still enabling smooth and reliable separation of the HDRM interface.

In some example embodiments, that may be combined with any one or more of the above-described embodiments, the non-circular external surface of the tapered projection of the first connector part, and the matching formed tapered recess of the second connector part, jointly provides a play-free connection between the first and second connector parts, when the projection is inserted in the recess and the first and second connector parts are pressed together by a release bolt or the like. Thereby, stress concentration and vibrations of the spacecraft structure will not be equally problematic for the HDRM interface.

The disclosure also relates to a launch vehicle having a longitudinal direction and a radial direction and comprising a dispenser structure carrying at least one spacecraft, which is releasably attached to an adjacent structure of a launch vehicle or of another spacecraft by means of a singular or plurality of HDRM interfaces in a single-point or multi-point attachment of the spacecraft for enabling controlled release of the at least one spacecraft, wherein each of the singular or plurality of HDRM interfaces is defined according to any of the embodiments described above, wherein one of the first and second parts of each of the singular or plurality of HDRM interfaces is fastened to the said adjacent structure, and the other of the first and second parts of each of the singular or plurality of HDRM interfaces is fastened to the spacecraft, and wherein a release bolt extends through the central through-holes of the first and second connector parts of each of the singular or plurality of HDRM interfaces and clamps said parts together.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The HDRM interface and associated method according to the disclosure will be described in detail in the following, with reference to the attached drawings, in which:

FIG. 1 shows a launch vehicle carrying a dispenser structure and a plurality of spacecrafts, FIG. 2 shows a dispenser structure with a single spacecraft, FIG. 3 shows a dispenser structure with multiple spacecrafts, FIG. 14-25 show cross-sections of various example embodiments of the HDRM interface in connected state, and FIG. 26 shows the main steps for mounting a spacecraft to an adjacent structure of a launch vehicle or of another spacecraft using a plurality of HDRM interfaces.

DESCRIPTION OF EXAMPLE EMBODIMENTS

Figure 4:
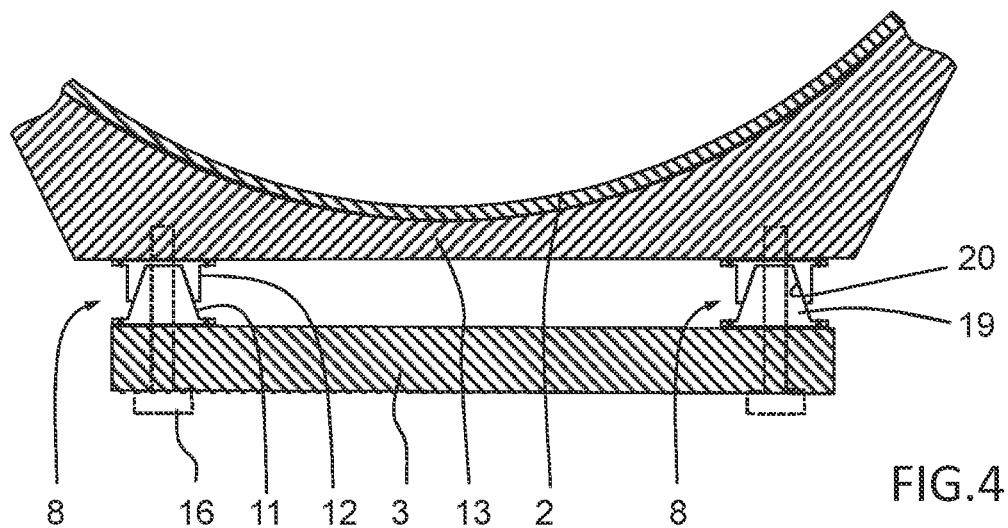
FIG. 4 shows a cross-section of a spacecraft attachment via HDRM interfaces.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIG. 1 schematically shows a side view of one example embodiment of a launch vehicle 1 comprising a dispenser structure 2, with a set of spacecrafts 3. The launch vehicle 1 has an extension in a longitudinal direction 4 and a radial direction 5, a final engine structure 6, also known as an upper stage, and a fairing 7 covering the dispenser structure 2 and spacecrafts 3. A lower side of the dispenser structure 2 may be bolted to the final engine structure 5 and configured for carrying a plurality of spacecrafts 3 during their transport from earth to space.

In the example illustrated in FIG. 1, the dispenser structure 2 may have a cylindrical shape with an axial direction parallel with the longitudinal direction 4 of the launch vehicle 1. The dispenser structure 2 may have a plurality of spacecrafts 3 mounted around its cylindrical outer surface, as well as on a top side thereof.

A spacecraft 3 mounted on the cylindrical surface of the dispenser structure 2 may be configured to the be released sideways, as illustrated by first release arrows 9, and a spacecraft 3 mounted on the top side of the dispenser structure 2 may be configured to the be released forwards, i.e. in the longitudinal direction 4, as illustrated by second release arrow 10. However, depending the design of the dispenser structure 2, spacecraft 3 and launch vehicle 1, the release direction of a spacecraft 3 may be different from the longitudinal and radial directions 4, 5 of the launch vehicle 1, and may be virtually any direction relative to a launch vehicle 1.

According to the example embodiment, a plurality of Hold Down Release Mechanism, HDRM, interfaces 8 are used for attachment of at least one spacecraft 3 to an adjacent structure of the launch vehicle, such as the dispenser structure 2. The HDRM interface 8, which is also known as separator device, typically include at least a first connector part 11 and a second connector part 12, wherein one of the first and second parts 11, 12 is configured to be fastened to the dispenser structure 2, and the other of the first and second parts 11, 12 is configured to be fastened to the spacecraft 3.

The release of a spacecraft 3 is typically performed after the launch vehicle 1 has set the spacecraft 3 in a proper position and after the fairing 7 has been removed. The HDRM interface 8 may include a release mechanism that enables separation of the first and second connector parts 11, 12 from each other, for example via a pyrotechnical device. The release of the spacecraft is for example controlled by an electrical signal and all HDRM interfaces 8 holding the same spacecraft are released simultaneously for ensuring a safe release of the spacecraft from the dispenser structure 2 and launch vehicle 1.

The launch vehicle 1 is for example a space rocket having multiple propulsion stages.

The dispenser structure 2 may have virtually any form and shape and serve to mount the spacecraft to the launch vehicle.

The spacecraft 3, also known as a payload, may be various types of apparatus or equipment configured for being located and operating in space, such as orbiting satellites, space exploration spacecrafts, etc.

FIG. 2 shows a perspective side view of an example embodiment of a cylindrical hollow dispenser structure 2 having a bottom side 14 for attachment to the launch vehicle 1 and a top side 15, plurality of attachment rings 13 for mounting a plurality of spacecrafts thereto. However, in FIG. 2 only a single spacecraft 3 in mounted state is shown. In the example embodiment of FIG. 2, four individual HDRM interfaces 8 are used for releasably attaching the spacecraft 3 to the dispenser structure 2, but other number of HDRM interfaces 8 may be alternatively be used, depending on the specific circumstances and requirements and type of spacecraft, etc.

FIG. 3 shows a top view of an example embodiment of a cylindrical hollow dispenser structure 2 having a plurality of spacecrafts 3 mounted thereto. Each spacecraft 3 is releasably mounted to the dispenser structure 2 via a multi-point attachment using a plurality of separate HDRM interfaces 8. The first release arrows 9 in FIG. 3 illustrates the release direction of the individual spacecrafts 3.

FIG. 4 schematically shows a cross-sectional view of an example embodiment of a cylindrical hollow dispenser structure 2 having an attachment ring 13 attached thereto for enabling mounting of at least one spacecrafts 3 thereto. Each HDRM interface 8 comprises first and second connector parts 11, 12 assembled and clamped together by means of a release mechanism 16 including a release bolt. The first connector part 11 has a tapered projection 19 with a non-circular external surface, and the second connector part 12 has a matching formed tapered recess 20 with a non-circular interior surface configured for rotational form-lockingly receiving the tapered projection 19, for enabling transfer of at least torsion load and shear load between the first and second connector parts 11, 12, when the projection 19 is inserted in the recess 20 and the first and second connector parts 11, 12 are pressed together.

Upon release activation of the release mechanism 16, the first and second connector parts 11, 12 become released from the each other and the spacecraft 3 may become separated from the dispenser structure 2 and associated attachment ring 13.

Figure 5:
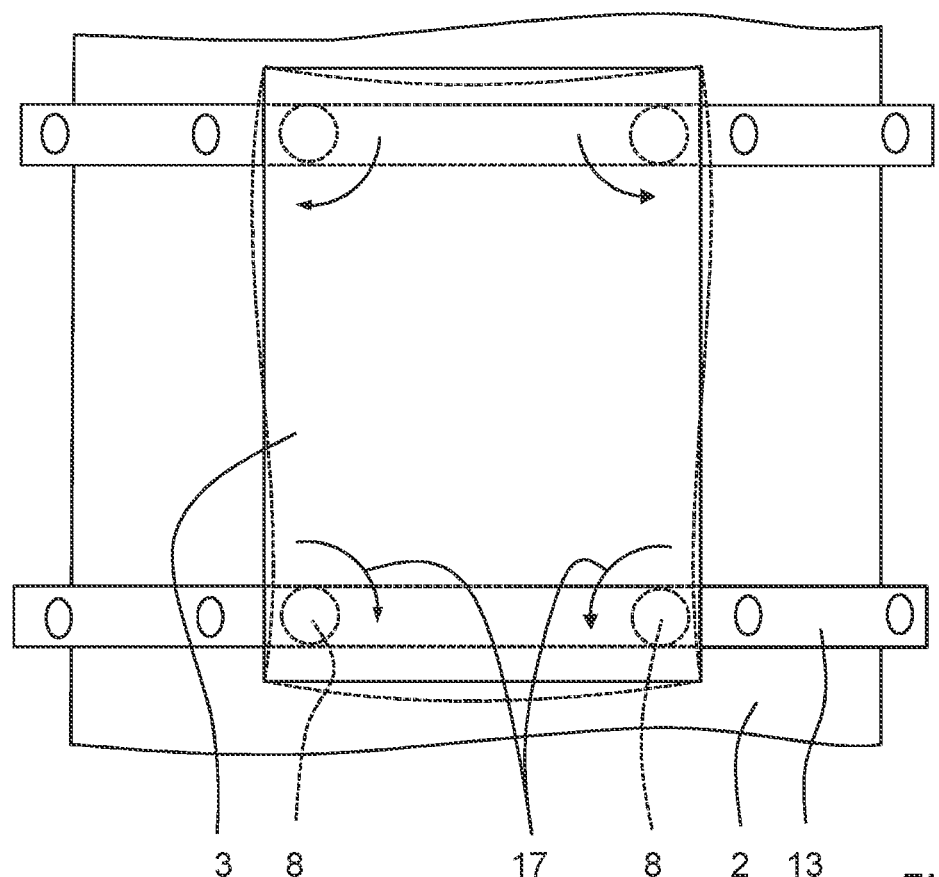
FIG. 5 shows the torsion load acting on a spacecraft.

FIG. 5 schematically shows a spacecraft 3 mounted to attachment rings 13 of a dispenser structure 2 via four individual HDRM interfaces 8. During launch of and flight of the launch vehicle, the spacecraft 3 is exerted to high acceleration forces, which may cause the spacecraft to deform structurally, as schematically illustrated by the dotted curved lines in FIG. 5, unless the HDRM interfaces 8 are capable of providing rotational support to the spacecraft 3. In other words, the HDRM interfaces 8 according to the disclosure blocks rotational motion of the spacecraft at the attachment location of the HDRM interfaces 8, as illustrated by rotational arrows 17 in FIG. 5, and thereby also assists in preventing torsional deformation of the spacecraft that may cause permanent damage or weakening of the structural rigidity of the spacecraft.

Figure 6A:
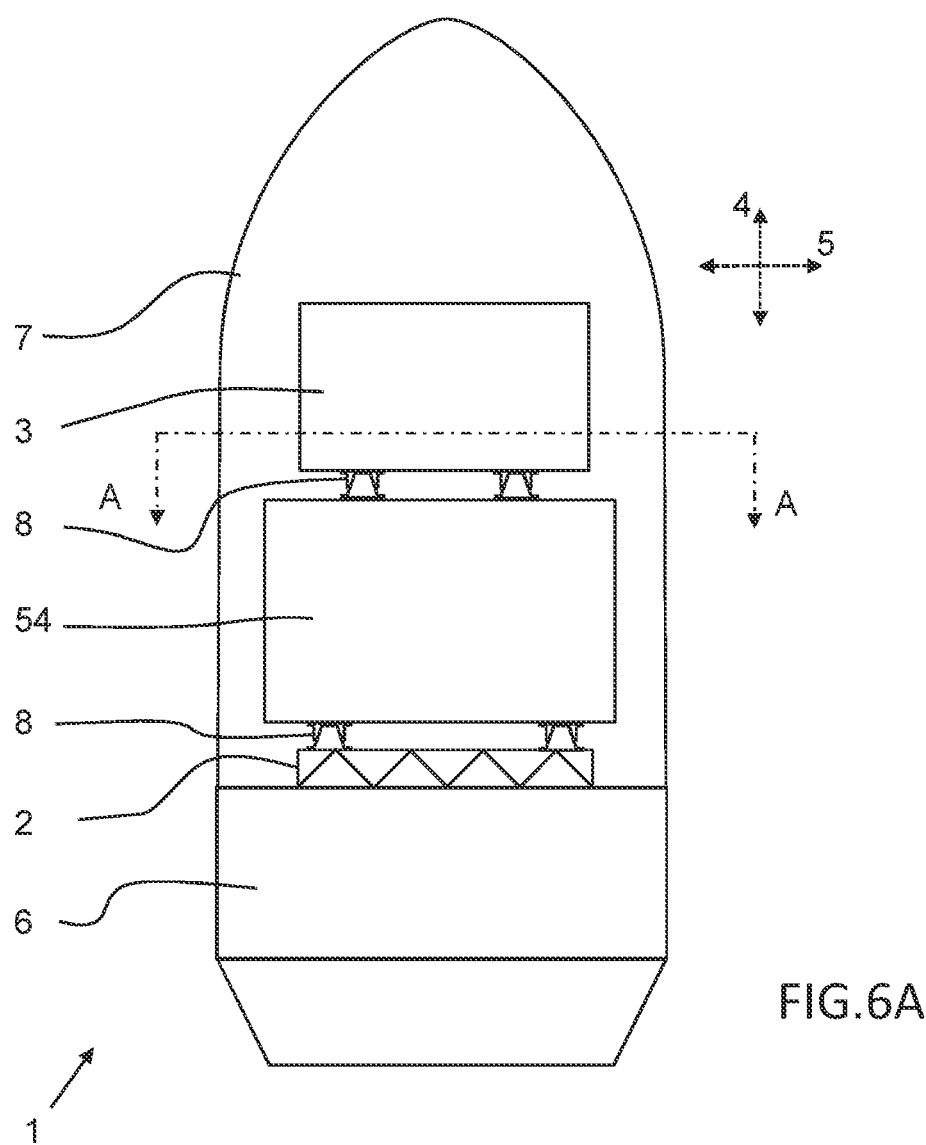
FIG. 6A shows a spacecraft attached to another spacecraft carried by the launch vehicle.

FIG. 6A illustrates schematically another implementation of the HDRM interface 8 according to the disclosure, namely as an interface for attachment of a spacecraft 3 to an adjacent structure of another spacecraft 54 that is carried by the launch vehicle 1.

In FIG. 6A, the launch vehicle 1 carries two spacecrafts 3: A lower spacecraft 54 attached to the final engine stage structure 6 of the launch vehicle 1 via a first set of HDRM interfaces 8, and an upper spacecraft 3 attached to the lower spacecraft 54 via a second set of HDRM interfaces 8.

The lower spacecraft 54 attached to the final engine stage structure 6 via a dispenser structure 2, which is also sometimes referred to as an adapter structure, and represents all types of rigid intermediate superstructure used as carrier structure for connecting a spacecraft 3, 54 to a launch vehicle 1.

The HDRM interfaces according to the disclosure may thus be used both for attachment of a spacecraft 54 to an adjacent structure of an adapter structure, and for attachment of a spacecraft 3 to an adjacent structure of another spacecraft 54.

Figure 6B:
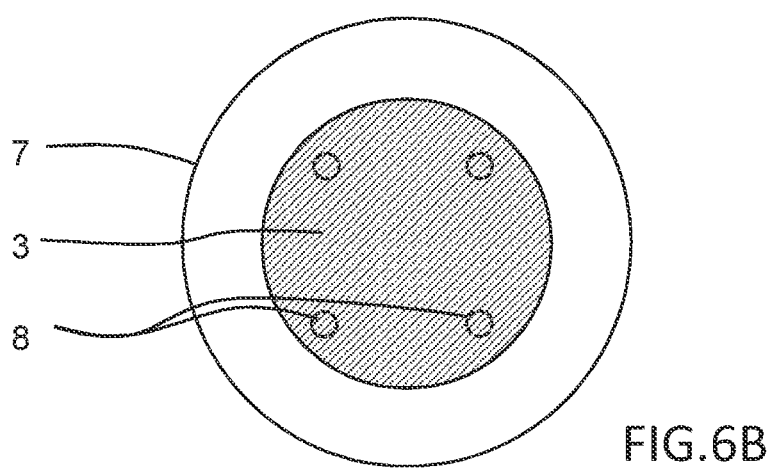
FIG. 6B shows a cross-section of the launch vehicle of FIG. 6A, FIG. 7A-9B show various views of an example embodiment of the HDRM interface.

FIG. 6B shows a cut along section A-A in FIG. 6A, and shows schematically a cross-section of the upper spacecraft 3, as well as the underlying second set of HDRM interfaces 8, which may include for example include four virtually identical and evenly distributed HDRM interfaces 8.

Consequently, with reference to FIGS. 1-6B, the present disclosure relates to a HDRM interface 8 for attachment of a spacecraft 3 to a launch vehicle 1, in particular to a dispenser structure 2 or adapter structure of a launch vehicle 1, or attachment of a spacecraft 3 to another spacecraft 54 carried by the launch vehicle. The HDRM interface 8 is configured for forming part of multi-point releasable attachment of the spacecraft 3 to said launch vehicle 1 or another spacecraft 54. The HDRM interface 8 comprises a first connector part 11 and a second connector part 12, wherein one of the first and second parts 11, 12 is configured to be fastened to said launch vehicle 1 or to another spacecraft 54, and the other of the first and second parts 11, 12 is configured to be fastened to the spacecraft 3. The first connector part 11 has a tapered projection 19 with a non-circular external surface, and the second connector part 12 has a matching formed tapered recess 20 with a non-circular interior surface configured for form-lockingly, specifically rotational form-lockingly, receiving the tapered projection 19, for enabling transfer of at least torsion load and shear load between the first and second connector parts 11, 12, when the tapered projection 19 is inserted in the recess 20 and the first and second connector parts 11, 12 are pressed together. Furthermore, both the tapered projection 19 of the first connector part 11 and the tapered recess 20 of the second connector part 12 have a central through-hole for receiving a release bolt configured to clamp the first and second connector parts 11, 12 together.

The feature stating that the first connector part 11 has a tapered projection 19 with a non-circular external surface means that a cross-section of the tapered projection 19, in a plane that is perpendicular to a projection direction of the tapered projection 19, has a non-circular external surface, because this ensure that the tapered projection provides rotational form-locking when engaged in the matching recess 20.

In other words, the tapered projection 19 may be deemed having finite rotational symmetry, i.e. a limited amount of angular positions having identical external surface shape.

Figure 9A:
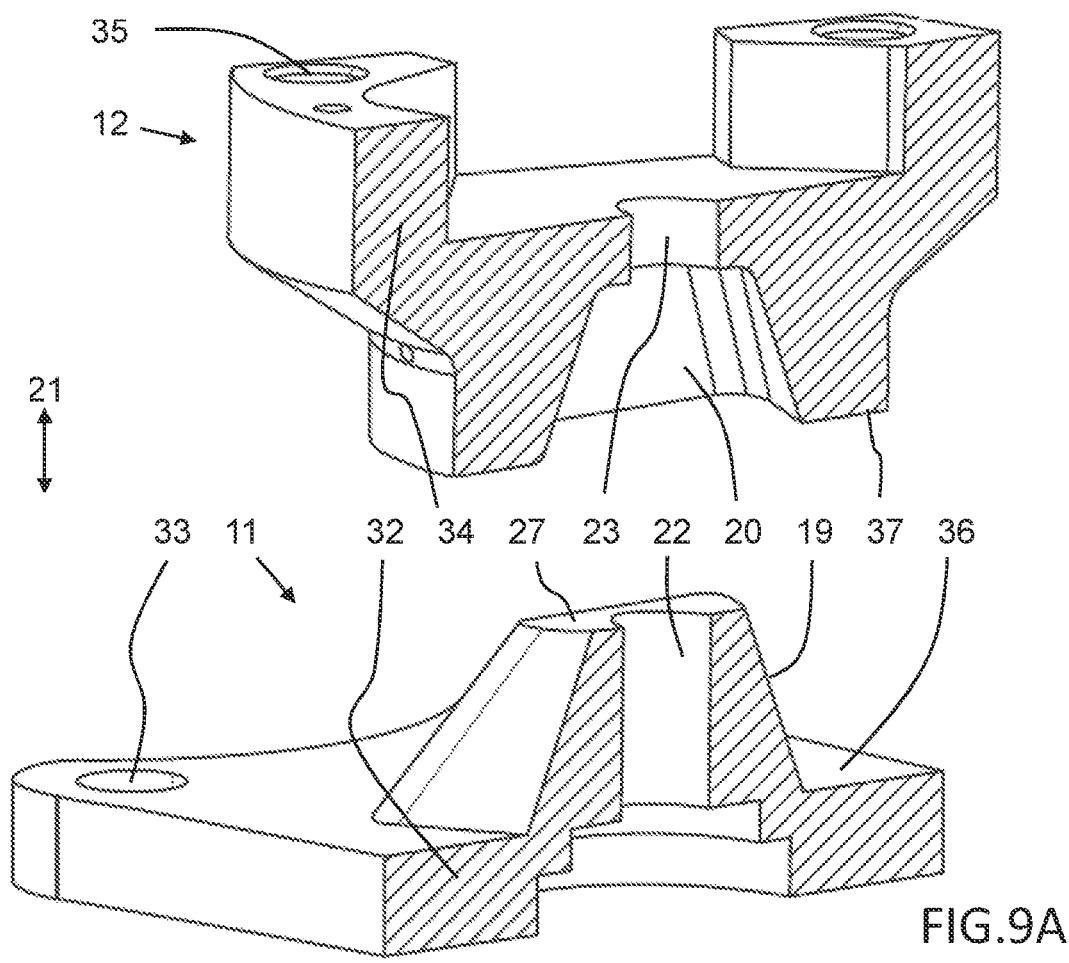
Figure 9B:
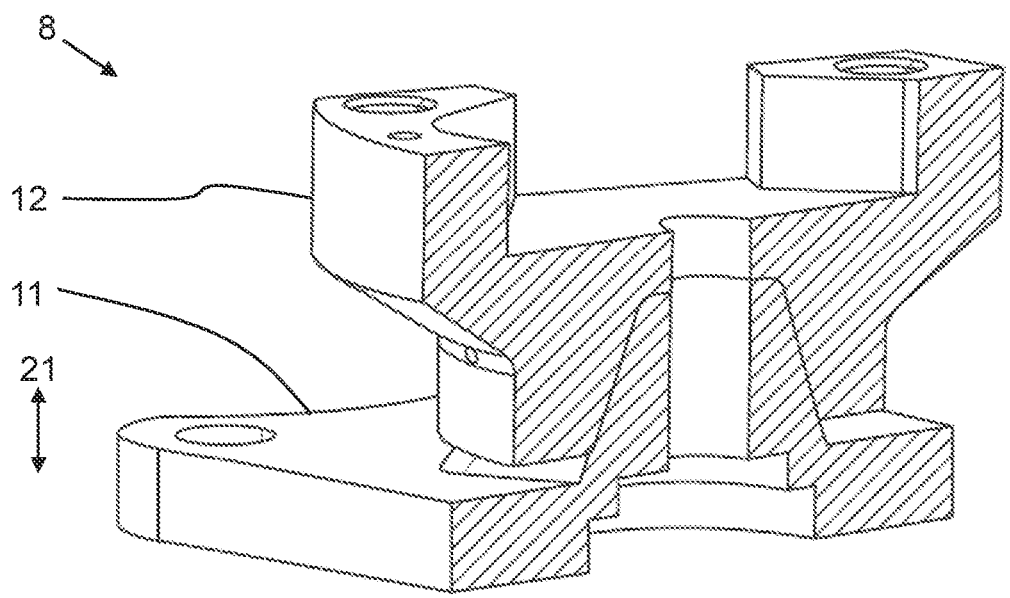

One example embodiment of the HDRM interface, including the first and second connector parts 11, 12, is described below with reference to FIGS. 7A-7B, 8A-8B and 9A-9B, wherein FIGS. 7A and 7B show perspective views of the first and second connector parts 11, 12, respectively, FIGS. 8A and 8B show top views of the first and second connector parts 11, 12, respectively, FIG. 9A shows a cross-sectional perspective view of the first and second connector parts in disconnected state, and FIG. 9B shows a cross-sectional perspective view of the first and second connector parts in connected state.

The tapered projection 19 of the first connector part 11 has the shape of a truncated substantially triangular pyramid, and the tapered recess 20 of the second connector part 12 has the shape of a truncated inverse substantially triangular pyramid.

As mentioned above, both the tapered projection 19 of the first connector part 11 and the tapered recess 20 of the second connector part 12 have a central through-hole 22, 23 for receiving a release bolt configured to clamp the first and second connector parts 11, 12 together.

The HDRM interface has a release direction 21, i.e. a direction along which one or both of the first and second connectors parts is configured to move during a release event of the HDRM interface. The release direction 21 is generally parallel with an axial direction of the central through-hole 22 of the tapered projection 19 and the central through-hole 23 of the tapered recess 20.

The truncated triangular pyramid-shaped tapered projection 19 of the first connector part 11 has a substantially triangular base 24, three lateral sides 25, three lateral edges 26, wherein each lateral edge 26 connects two neighbouring lateral sides 25. The top side 27 of the pyramid is truncated, i.e. made flat or at least substantially flat.

The lateral edges 26 are rounded for enabling use of rounded edges in the recess 20 of the second connector part 12, thereby simplifying manufacturing of the recess 20 using cutting tools. The rounded lateral edges 26 of the projection also assists in reducing stress concentrations.

Due to the above-mentioned rounded edges 26 the base of the pyramid is not fully triangular in terms of strict polygon geometrical form having only straight lines, but rather substantially triangular. However, the overall shape of the pyramid-shaped tapered projection is clearly triangular. Hence, the first connector part 11 may be deemed having the shape of a truncated triangular pyramid.

The inverse truncated triangular pyramid-shaped tapered recess 20 of the second connector part 12 has a substantially triangular opening 28, three lateral sides 29, three lateral edges 30, wherein each lateral edge 30 connects two neighbouring lateral sides 29. The bottom side 31 of the inverse pyramid is truncated, i.e. made flat or at least substantially flat.

The lateral edges 30 are rounded for simplifying manufacturing of the recess 20 using cutting tools. The rounded lateral edges 30 of the recess also assists in reducing stress concentrations.

Due to the above-mentioned rounded edges 30 the opening 28 of the inverse pyramid is not fully triangular in terms of strict polygon geometrical form having only straight lines, but rather substantially triangular. However, the overall shape of the inverse pyramid-shaped tapered recess 20 is clearly triangular. Hence, the second connector part 12 may be deemed having the shape of a truncated inverse triangular pyramid.

The three lateral sides 25 of the pyramid and three lateral sides 29 of the recess 19 are flat to provide good rotational form-locking between the tapered projection 19 and tapered recess 20, for enabling transfer of high torsion load.

The triangular pyramid-shaped tapered projection 19 of the first connector part 11, the inverse triangular-shaped tapered recess 20 of the second connector part 12 provides a reliable form-locking feature that is able to transfer a torsion load over the HDRM interface, while still enabling a reliable separation. It has come to the inventor's knowledge that such needs exist, since some spacecrafts are designed such that they generate a relatively high torsion load at the separable interface joint, i.e. at the HDRM interface. Such torsion load cannot be transferred with a conventional non-rotationally locked cup and cone interface. The present disclosure replaces the conventional circular cup and cone design with a three-sided pyramid-shaped HDRM interface. The pyramid shape allows for transfer of high torsion loads combined with transfer of high shear loads.

Furthermore, due to the pyramid-shaped interface being three-sided, the HDRM interface provides a rotationally locked connection free from play that is otherwise generally difficult to achieve due to manufacturing tolerances in the mounted state. For example, a four-sided pyramid-shaped tapered projection 19 would typically not provide an equally play-free connection because manufacturing tolerances will often generate a certain level of play between two of the four lateral sides 25, 29. Keeping the play between the first and second connector parts 11, 12 at a minimum level is generally desirable in view of the dynamic environment the HDRM interfaces are subjected to and for which the HDRM interface shall be qualified.

Consequently, the non-circular external surface of the tapered projection 19 of the first connector part 11, and the matching formed tapered recess 20 of the second connector part 12, jointly provides a play-free connection between the first and second connector parts 11, 12, when the projection 19 is inserted in the recess 20 and the first and second connector parts 11, 12 are pressed together by a release bolt 47 or the like.

The terms lateral side and lateral edge herein refers to sides and edges directed or facing sideways of the first and second connector parts 11, 12. In other words directed or facing in a direction primarily associated with a direction perpendicular to said release direction 21, or at least directed or facing in a direction having a component that is perpendicular to said release direction 21.

The first connector part 11 may have a first attachment flange 32 for attachment to an adjacent structure of the spacecraft 3 or launch vehicle 1. The first attachment flange 32 may for example have a plurality of free-running or threaded holes 33 for receiving fasteners, such as threaded members or bolts, for attaching the first connector part 11 to an adjacent structure of an object.

Similarly, the second connector part 12 may have a second attachment flange 34 for attachment to an adjacent structure of the spacecraft 3 or launch vehicle 1. The second attachment flange 34 may for example have a plurality of free-running or threaded holes 35 for receiving fasteners, such as threaded members or bolts, for attaching the second connector part 12 to an object.

The first connection part 11 may further have a forward facing surface 36 located next to the projection 19. This forward facing surface 36 may form part of the first attachment flange 32. Similarly, the second connection part 12 may also have a forward facing surface 37 located next to the recess 20. The forward facing surface 36 of the first connector part 11 will face, and possibly abut, the forward facing surface 37 of the second connector part 12. The forward facing surface 37 of the second connector part 12 may form part of the second attachment flange 34, or forming a protrusion on the second attachment flange 34.

According to some example embodiments, one, or both, of said forward facing surfaces 36, 37 of the first and second connection parts 11, 12, will be substantially free from structures or features that provide rotational-locking between the first and second connector parts 11, 12 in mutually connected state. For example, one, or both, of said forward facing surfaces 36, 37 of the first and second connection parts 11, 12, may be substantially flat for avoiding any type of rotational-locking between the first and second connector parts 11, 12 in mutually connected state.

Consequently, rotational locking is solely provided by the tapered projection and the matching formed tapered recess configured for rotational form-locking connection of the first and second connector parts 11, 12. By providing rotational form-locking solely by means of the projection/recess, any undesirable interference in terms of rotational locking of the first and second connector parts 11, 12, caused by the forward facing surfaces 36, 37 of the first and second connection parts 11, 12, is avoided, thereby reducing risk for undesirable play between the first and second connector parts 11, 12, in mutually connected state.

Similarly, according to some example embodiments, one or both of the top side 27 of the pyramid and the bottom side 31 of the inverse pyramid will be substantially free from structures or features that provide rotational-locking between the first and second connector parts 11, 12 in mutually connected state. For example, one or both of the top side 27 of the pyramid and the bottom side 31 of the inverse pyramid may be substantially flat for avoiding any type of rotational-locking between the first and second connector parts 11, 12 in mutually connected state. Consequently, rotational locking is solely provided by the tapered projection and the matching formed tapered recess configured for rotational form-locking connection of the first and second connector parts 11, 12, thereby reducing risk for undesirable play between the first and second connector parts 11, 12, in mutually connected state, as described above.

Figure 10:
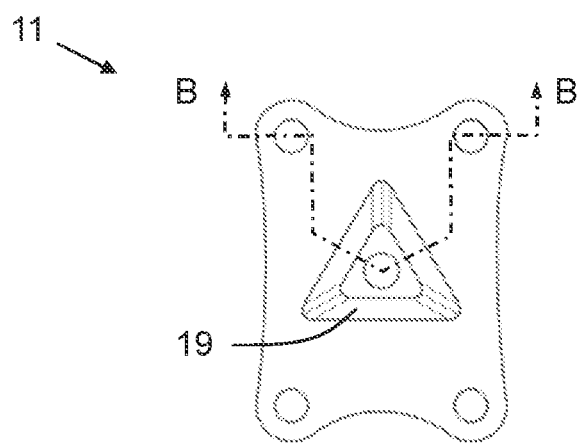
FIG. 10 shows a section line through a connector part.
Figure 11A:
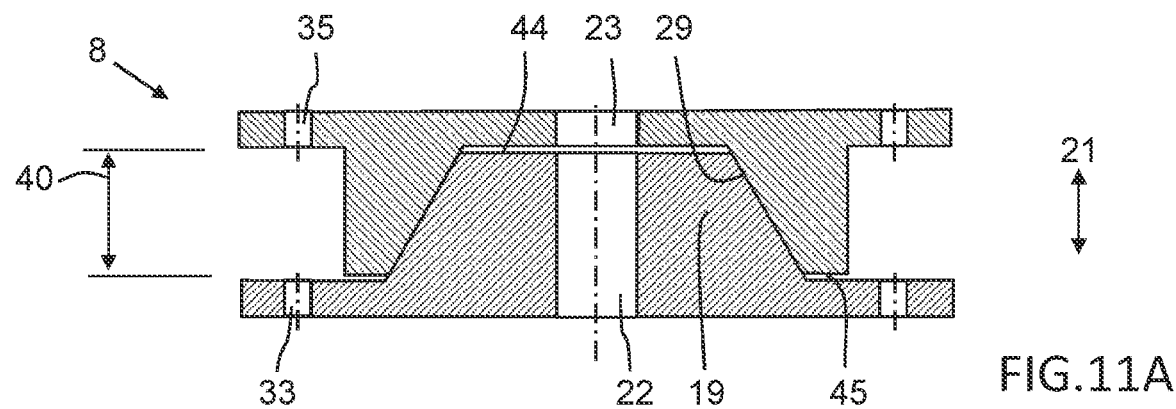
FIG. 11A-13B show a cross-sections of various example embodiments of the HDRM interface in connected and separated state.
Figure 11B:
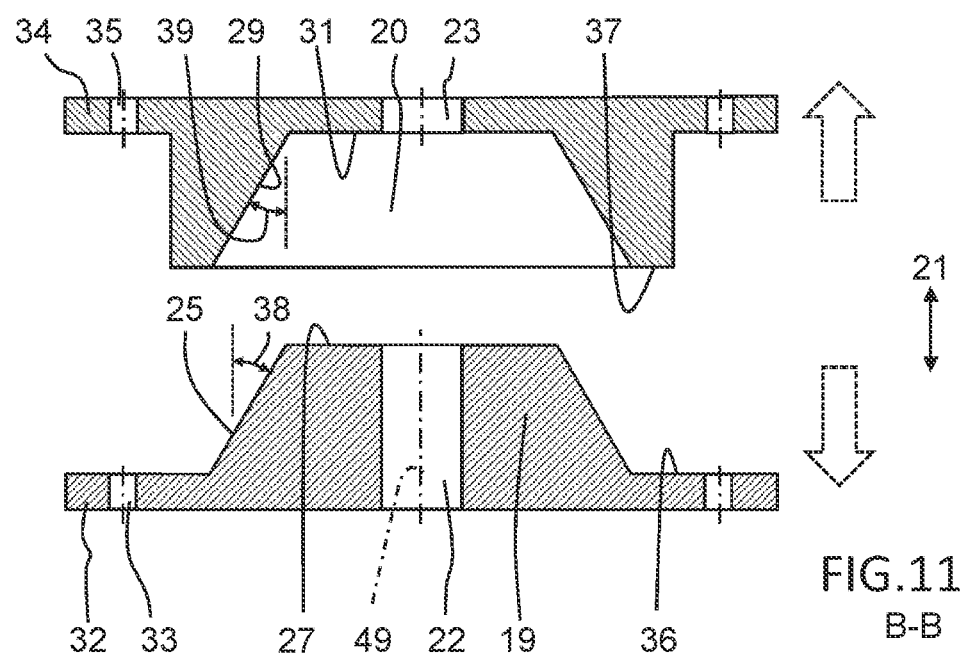

FIG. 10 shows schematically a top view of the first connector part 11 with tapered projection 19, as well as a cross-sectional line B-B extending over the projection 19 for better describing the form and function of the projection and recess of the HDRM interface. Specifically, a cross-section of one example embodiment of the HDRM interface along section B-B is illustrated in FIGS. 11A and 11B, wherein FIG. 11A shows the HDRM interface in connected state, and FIG. 11B shows the HDRM interface in disconnected state, such as for example shortly after separation as illustrated by dotted separation arrows in FIG. 11B.

An exterior surface of a flat lateral side 25 of the tapered projection 19 of the first connector part 19 defines a tapering angle 38, relative to the release direction 21 of the HDRM interface 8, in the range of 5-45°, specifically in the range of 10-30°. The tapering angle 38 is measured in a plane that is perpendicular with the flat lateral side 25 and parallel and coincides with an axis of the through hole 22 of projection 19.

Similarly, an interior surface of a flat lateral side 29 of the tapered recess 20 of the second connector part 20 defines a tapering angle 39, relative to the release direction 21 of the HDRM interface 8, in the range of 5-45°, specifically in the range of 10-30°.

For ensuring a play-free connection between the first and second connector parts 11, 12, the tapering angles 38, 39 of the first and second connector parts 11, 12 are preferably selected to be equal, i.e. the same.

In some example embodiments, the size and shape of the projection 19 and the recess 20 may be selected, such that the top side 27 of the projection 19 is spaced apart from the bottom side 31 of the recess 20 in connected state of the HDRM interface. This is illustrated by a first gap 44 in FIG. 11A and may assist in providing a tighter fit between the lateral sides 25, 29 of the projection 19 and recess 20, thereby reducing risk for undesirable play between the first and second connector parts 11, 12.

In addition, in some example embodiments, the size and shape of the projection 19 and the recess 20 may be selected, such that the forward facing surface 36 of first connector part 11 is spaced apart from the forward facing surface 37 of second connector part 12 in connected state of the HDRM interface. This is illustrated by a second gap 45 in FIG. 11A and may further assist in providing a tighter fit between the lateral sides 25, 29 of the projection 19 and recess 20, thereby reducing risk for undesirable play between the first and second connector parts 11, 12.

However, in some example embodiments, the size and shape of the projection 19 and the recess 20 may be selected, such that the top side 27 of the projection 19 abuts the bottom side 31 of the recess 20 in connected state of the HDRM interface, and/or such that the forward facing surface 36 of first connector part 11 abuts the forward facing surface 37 of second connector part 12 in connected state of the HDRM interface, for enabling transfer of high loads in the release direction 21.

Figure 12A:
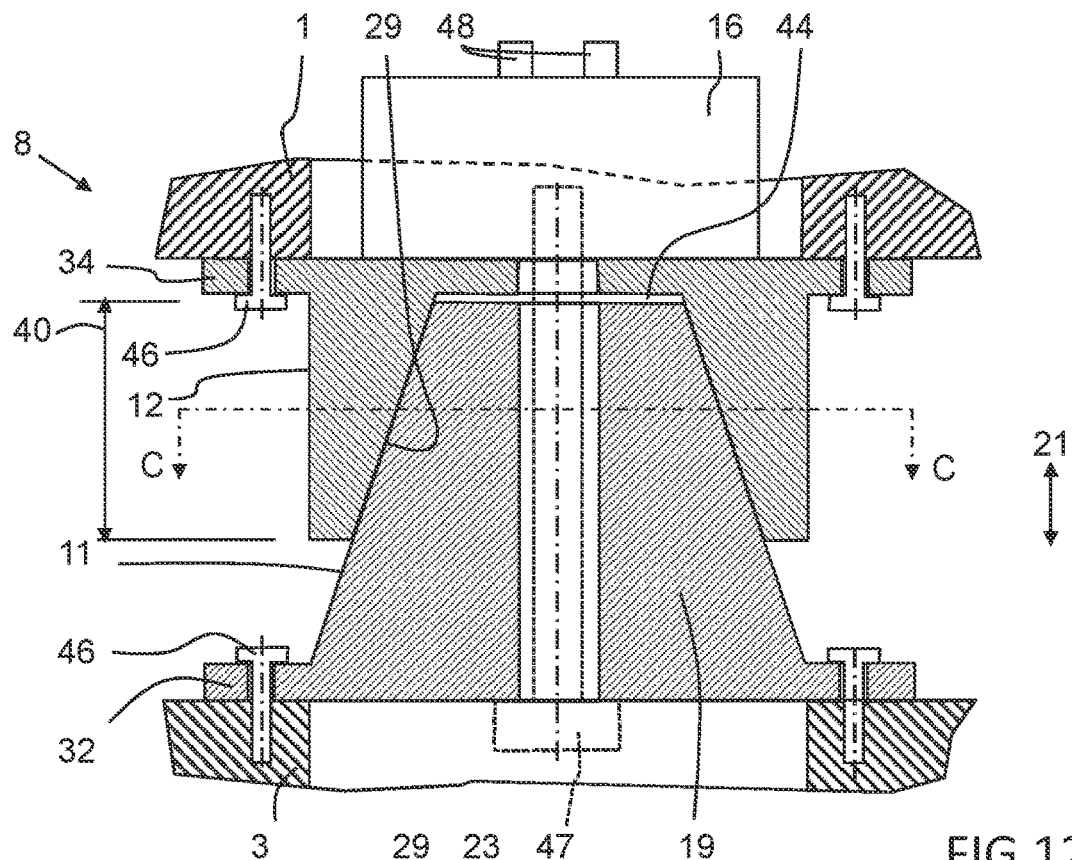
Figure 12B:
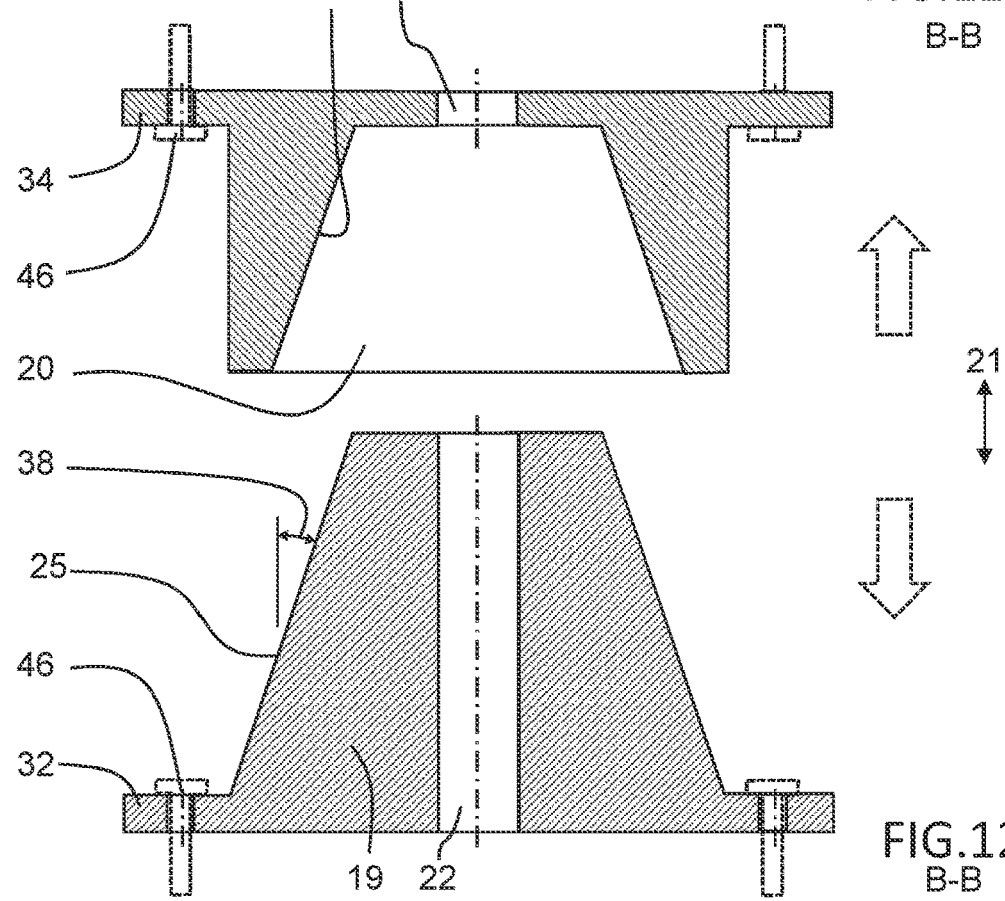

A cross-section of a further example embodiment of the HDRM interface along section B-B of FIG. 10 is described below with reference to FIGS. 12A and 12B, wherein FIG. 12A shows the HDRM interface in connected state, and FIG. 12B shows the HDRM interface in disconnected state, such as for example shortly after separation as illustrated by dotted separation arrows in FIG. 12B. Features having some reference signs as in FIGS. 11A-B are not repeated here.

In this example embodiment, the tapering angle 38 is significantly smaller and a length 40 of a contact overlap of the projection 19 and recess 20 in the release direction 21 in connected state is significantly larger, thereby enabling transfer of increased torsion and shear load.

In some example embodiments, the length 40 of the contact overlap of the projection 19 and recess 20 in the release direction 21 in connected state is at least 10%, specifically at least 20%, and more specifically at least 30%, of a maximal diameter of the projection 19 within said overlap. The term contact overlap means of the portion of the overlap having contact between the projection 19 and recess 20.

In this example embodiment, the HDRM interface 8 is illustrated connected with the spacecraft 3 and a carrier structure in form of a launch vehicle 1, a dispenser structure, an adapter structure or another spacecraft 54. Specifically, the first connector part 11 may have a first attachment flange 32 with a plurality of holes with fasteners 46, which clamp the first connector part 11 to an adjacent structure of for example the spacecraft 3 to be releasably attached by means of the HDRM interface 8.

Furthermore, the second connector part 12 may have a second attachment flange 34 with a plurality of holes 35 for receiving fasteners 46, such as threaded members or bolts, for attaching the second connector part 12 to an adjacent structure of a launch vehicle 1 or another spacecraft 54.

In FIG. 12A, a release bolt 47 extends through the through-hole 22, 23 of the projection 19 and recess 20, respectively, and clamps the first and second connector part 11, 12 together, and a release mechanism 16 with a set of electrical terminals 48 are provided for enabling activation of release mechanism 16.

Figure 13A:
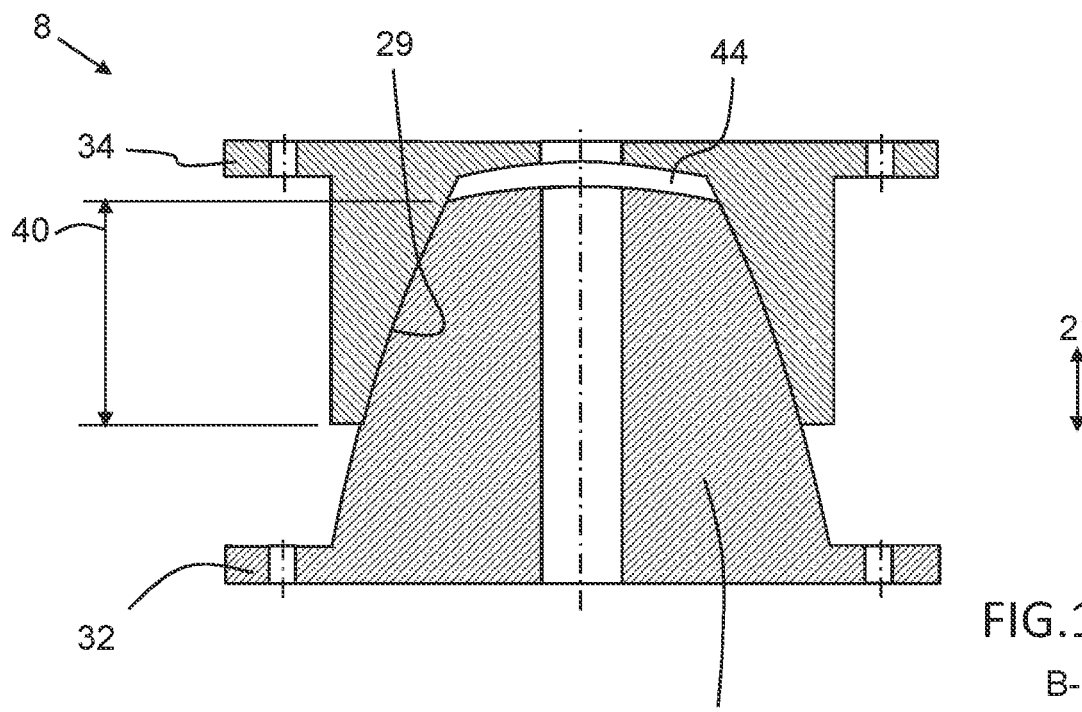
Figure 13B:
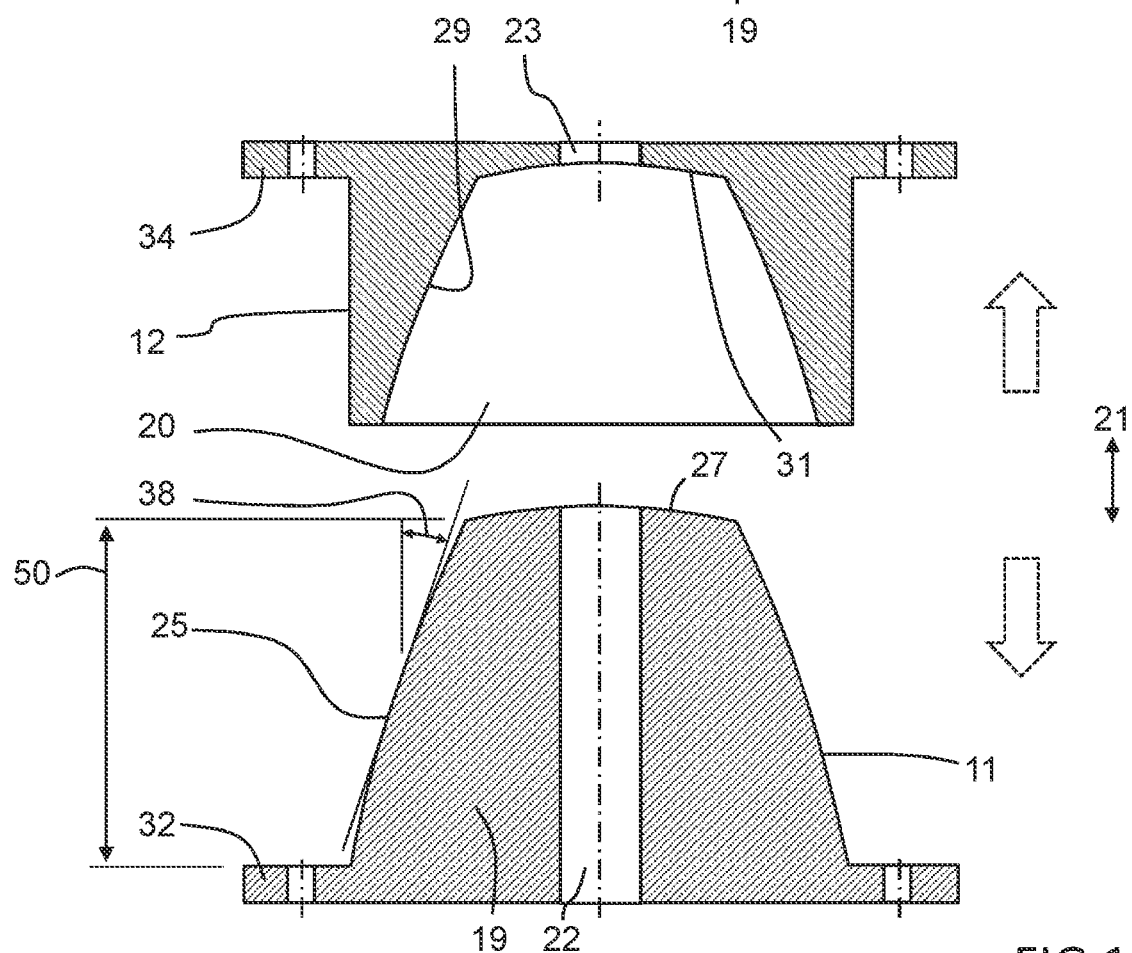
Figure 14:
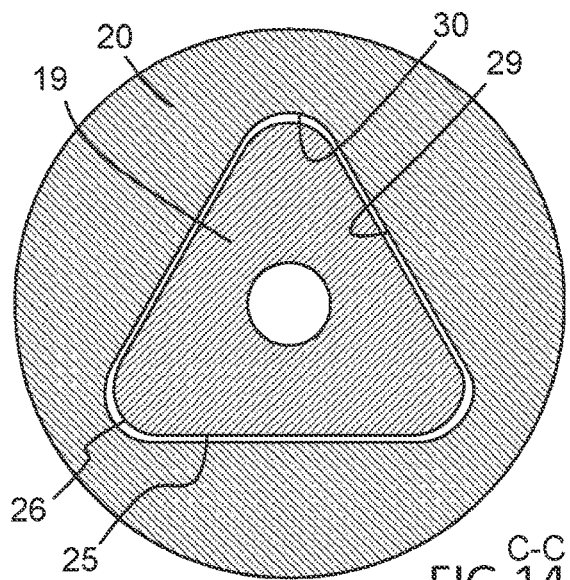

A cross-section of a further example embodiment of the HDRM interface along section B-B of FIG. 10 is described below with reference to FIGS. 13A and 13B, wherein FIG. 13A shows the HDRM interface in connected state, and FIG. 13B shows the HDRM interface in disconnected state, such as for example shortly after separation as illustrated by dotted separation arrows in FIG. 13B. Features having some reference signs as in FIGS. 11A-B are not repeated here.

This example embodiment schematically illustrates the lateral sides 25 of the projection 19 may deviate from being a flat surface to a certain extent. For example, as long as the release functionality and load transfer capability of the HDRM interface is acceptable, the lateral sides 25 of the projection may have a slightly convex form, as showed in FIGS. 13A and 13B, or a concave form. The tapering angle 38 of a curved lateral side 25 corresponds to an average tapering angle 38 over a full length 50 of said lateral side 25, in the release direction 21. The form, shape and curvature of the lateral side 29 of the recess 20 has a matching shape to provide a play-free connection.

This example embodiment schematically illustrates that also the top side 27 of the projection 19 may deviate from being a flat surface to a certain extent. For example, the top side 27 may have a slightly convex form, as showed in FIGS. 13A and 13B, or a concave form. The form, shape and curvature of the bottom side 31 of the recess 20 may have a matching shape, especially in embodiments in which the top and bottom sides 27 make contact in connected state. Otherwise, the shape of the bottom side 31 of the recess 20 may deviate from the shape of the top side 27 of the projection 19.

FIGS. 14-25 schematically illustrates cross-sections of the tapered projection 19 of the first connector part 11 and the recess 20 of the second connector part 12, in a plane perpendicular to a release direction of the HDRM interface, as showed by cross-sectional line C-C in FIG. 12A, for various alternative example embodiments of the HDRM interface 8.

With reference to FIGS. 14-22, an exterior outline of a cross-section of the tapered projection 19 of the first connector part 11, in a plane perpendicular to a release direction of the HDRM interface 8, may have three substantially straight lateral sides 25 that are mutually connected by sharp or rounded and/or bevelled lateral edges 26.

The three substantially straight lateral sides 25 and associated sharp or rounded and/or bevelled lateral edges 26 may extend over all, or at least a substantial portion of the projection 19 in the release direction 21.

The three substantially straight lateral sides 29 that are mutually connected by rounded and/or bevelled lateral edges 30 may extend over all, or at least a substantial portion of the recess 20 in the release direction 21.

With reference to FIGS. 14-21, an exterior outline of a cross-section of the tapered projection 19 of the first connector part 11, in a plane perpendicular to a release direction of the HDRM interface, may have three substantially straight sides with equal length 51. This length 51 of lateral side, in a plane perpendicular to a release direction of the HDRM interface 8, is illustrated in FIG. 20 and FIG. 21.

The three straight lateral sides 25 of the projection 19 are either straight or substantially straight, and the three lateral sides 29 of the recess 20 are straight or substantially straight, in a plane perpendicular to a release direction of the HDRM interface 8. For example, the exterior outline of a cross-section of the tapered projection 19 and recess is straight in the example embodiments of FIG. 14-16, 18-22 and the exterior outline of a cross-section of the tapered projection 19 and recess 20 is curved and substantially straight in the example embodiment of FIG. 15.

Figure 15:
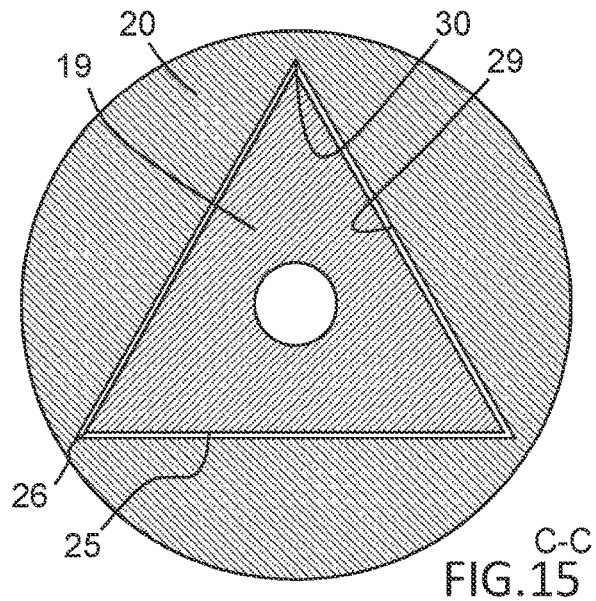
Figure 16:
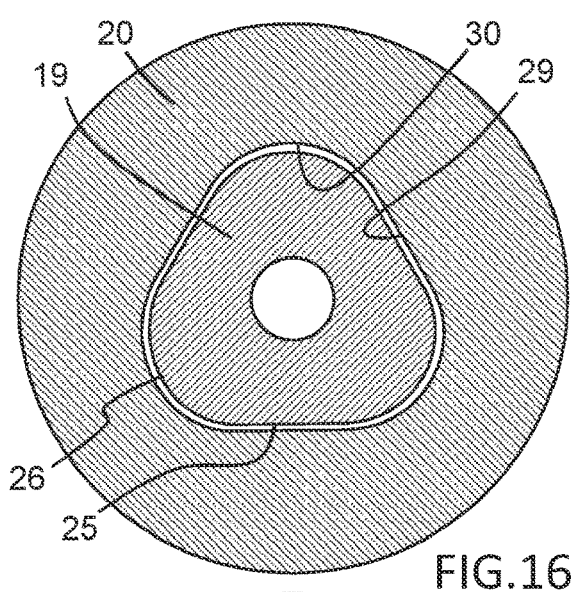
Figure 17:
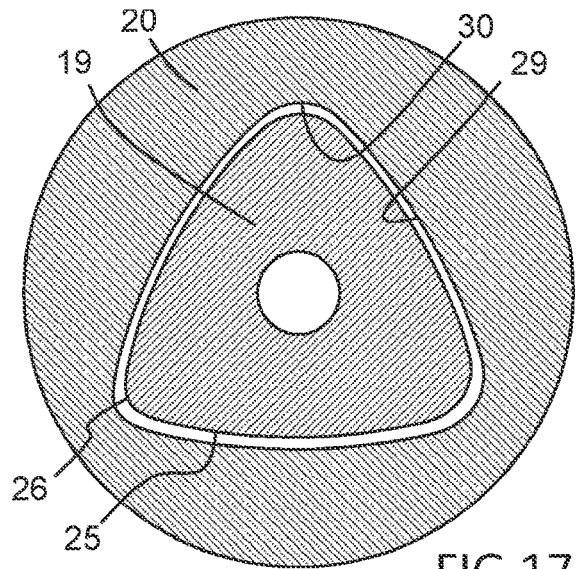
Figure 18:
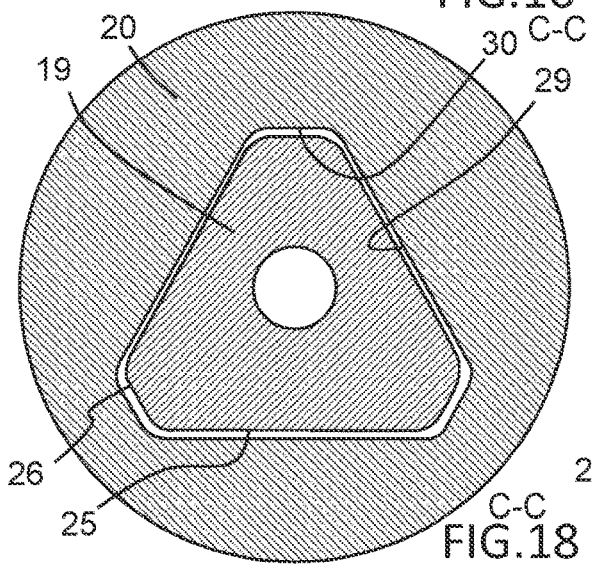
Figure 19:
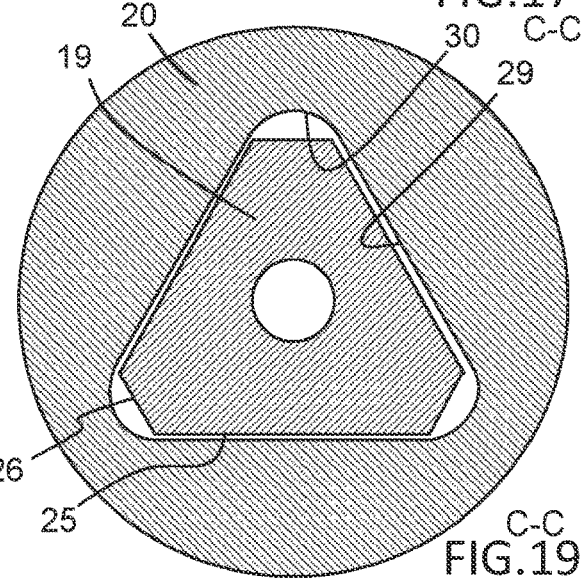

As mentioned above, the exterior outline of a cross-section of the tapered projection 19, in a plane perpendicular to a release direction of the HDRM interface, has sharp or rounded or bevelled lateral edges 26. For example, the embodiment of FIG. 15 show sharp lateral edges 26, the embodiments of FIGS. 14, 16-18, 20-22 have rounded lateral edges 26, and the embodiments of FIGS. 18 and 19 have bevelled lateral edges 26.

Similarly, the exterior outline of a cross-section of the tapered recess 20, in a plane perpendicular to a release direction of the HDRM interface, has sharp or rounded or bevelled lateral edges 30. For example, the embodiment of FIG. 15 show sharp lateral edges 30, the embodiments of FIGS. 14, 16-19, 21-22 have rounded lateral edges 26, and the embodiments of FIGS. 18 and 20 have bevelled lateral edges 30.

Furthermore, in some example embodiments, the tapered projection 19 has a different number of lateral sides 25 compared with the number of lateral sides 29 of the recess 20. In the example embodiment of FIG. 23, the tapered projection 19 has six lateral sides 25 and the recess 20 has three lateral sides 29.

Furthermore, in some example embodiments, the projection 19 and recess 20 may have other form-locking shapes. In the example embodiment of FIG. 24, an exterior outline of a cross-section of the tapered projection 19, in a plane perpendicular to a release direction of the HDRM interface 8, may have four substantially straight lateral sides 25 that are mutually connected by sharp or rounded and/or bevelled lateral edges 26, and the recess 20 has four matching lateral sides 29.

In the example embodiment of FIG. 25, an exterior outline of a cross-section of the tapered projection 19, in a plane perpendicular to a release direction of the HDRM interface 8, may have five substantially straight lateral sides 25 that are mutually connected by sharp or rounded and/or bevelled lateral edges 26, and the recess 20 has five matching lateral sides 29.

In other words, in view of the various possible alternative designs of the projection and recess, while still providing a form-locking feature, the lateral surface area of the tapered projection 19 of the first connector part 11 may be defined by a set of flat, or substantially flat, lateral sides 25, specifically an odd number of lateral sides 25, and more specifically three or five lateral sides 25, wherein the lateral sides 25 of the projection 19 are mutually connected via sharp or rounded or bevelled lateral edges 26, i.e. corner regions. Furthermore, the lateral surface area of the tapered recess 20 of the second connector part 12 may be defined by a set of flat, or substantially flat, lateral sides 29, specifically an odd number of lateral sides 29, and more specifically three or five lateral sides 29, wherein the lateral sides 29 of the recess 20 are mutually connected via sharp or rounded or bevelled lateral edges 30, i.e. corner regions.

Specifically, the tapered projection 19 of the first connector part 11 may have a shape of a truncated or non-truncated pyramid with odd number of main lateral sides 25, such as in particular three or five or seven main lateral sides 25, and the tapered recess 20 of the second connector part 12 may have the shape of an inverse truncated or non-truncated pyramid with odd number of main lateral sides 29, such as in particular three, five or seven main lateral sides 29.

With reference FIG. 21, in some example embodiments of the disclosure, an effective minimal contact length 51 of a straight lateral side 25 of an exterior outline of a cross-section of the tapered projection 19 of the first connector part 11, in a plane perpendicular to a release direction of the HDRM interface, is at least 50%, specifically at least 75%, and more specifically at least 90%, of a length 52 of an oppositely facing straight lateral side 29 of the tapered recess 20 of the second connector part 12, in said plane. A relatively large effective contact length 51 is generally better in view of form-locking and torsion load transfer capability.

Similarly, with reference FIG. 20, in some example embodiments of the disclosure, an effective minimal total contact length 51, i.e. accumulated total length 51 of all lateral sides 25, of an exterior outline of a cross-section of the tapered projection 19 of the first connector part 11, in a plane perpendicular to a release direction of the HDRM interface, is at least 50%, specifically at least 75%, and more specifically at least 90%, of a total length 53 of oppositely facing interior outline of a cross-section of the tapered recess 20 of the second connector part, in said plane. A relatively large effective accumulated contact length 51 is generally better in view of form-locking and torsion load transfer capability.

With reference to for example FIGS. 1-4 and 6A-6B, the disclosure also relates to a launch vehicle 1 having a longitudinal direction 4 and a radial direction 5 and comprising a dispenser structure 2 carrying at least one spacecraft 3, which is releasably attached to an adjacent structure of a launch vehicle 1 or of another spacecraft 54 by means of a plurality of HDRM interfaces 8 in a multi-point attachment of the spacecraft 3 for enabling controlled release of the at least one spacecraft 3, wherein each of the plurality of HDRM interfaces 8 is defined as described above, wherein one of the first and second parts of each of the plurality of HDRM interfaces 8 is fastened to the said adjacent structure, and the other of the first and second parts 11, 12 of each of the plurality of HDRM interfaces 8 is fastened to the spacecraft 3, and wherein a release bolt 47 extends through the central through-hole 22, 23 of the first and second connector parts 11, 12 of each of the plurality of HDRM interfaces 8 and clamps said parts together.

The disclosure also relates to a method for mounting a spacecraft to an adjacent structure of a launch vehicle, such as a dispenser structure or adapter structure of a launch vehicle, or of another spacecraft 54, using a singular or plurality of HDRM interfaces forming part of a single-point or multi-point attachment of the spacecraft 3 to said adjacent structure. FIG. 26 shows the main steps of the method, wherein a first step S1 involves providing a singular or plurality of HDRM interfaces 8, each having a first connector part 11 having a tapered projection 19 with a non-circular external surface and a central through-hole 22, and a second connector part 12 having a matching formed tapered recess 20 with a non-circular interior surface configured for form-lockingly receiving the tapered projection 19, for enabling transfer of at least torsion load and shear load between the first and second connector parts 11, 12, when the projection is inserted in the recess and the first and second connector parts are pressed together, wherein also the second connector part has central through-hole.

The method further comprises a second step S2 of providing a singular or plurality of release bolts 47 and inserting a release bolt through the central through hole of the first and second connector parts 11, 12 of each of the singular or plurality of HDRM interfaces 8 and clamping the first and second connector parts together by means of said release bolt to form a singular or plurality of assembled HDRM interfaces.

The method further comprises a third step S3 of attaching one of the first and second parts of the singular or plurality of HDRM interfaces 8 to said adjacent structure and attaching the spacecraft 3 to the other of the first and second parts of the singular or plurality of HDRM interfaces 8.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS | |
|---|---|
| 1. | Launch vehicle |
| 2. | Dispenser structure |
| 3. | Spacecraft |
| 4. | Longitudinal direction |
| 5. | Radial direction |
| 6. | Final engine structure |
| 7. | Fairing |
| 8. | HDRM interface |
| 9. | First release arrow |
| 10. | Second release arrow |
| 11. | First connector part |
| 12. | Second connector part |
| 13. | Attachment ring |
| 14. | Bottom side |
| 15. | Top side |
| 16. | Release mechanism |
| 17. | Rotational force |
| 19. | Tapered projection |
| 20. | Tapered recess |

REFERENCE SIGNS (continued)

| | |
|---|---|
| 21. | Release direction |
| 22. | Through hole of first connector part |
| 23. | Through hole of second connector part |
| 24. | Base of projection |
| 25. | Lateral side of projection |
| 26. | Lateral edge of projection |
| 27. | Top side of projection |
| 28. | Opening of recess |
| 29. | Lateral side of recess |
| 30. | Lateral edge of recess |
| 31. | Bottom side of recess |
| 32. | First attachment flange |
| 33. | Holes of first attachment flange |
| 34. | Second attachment flange |
| 35. | Holes of second attachment flange |
| 36. | Forward facing surface of first connector part |
| 37. | Forward facing surface of second connector part |
| 38. | Tapering angle of projection |
| 39. | Tapering angle of recess |
| 40. | Overlap in release direction |
| 44. | First gap |
| 45. | Second gap |
| 46. | Fastener |
| 47. | Release bolt |
| 48. | Electrical terminals |
| 49. | Axis of the through hole of projection |
| 50. | Length of lateral side of projection in release direction |
| 51. | Length of lateral side of projection in cross-section |
| 52. | Length of lateral side of recess in cross-section |
| 53. | Total length of recess in cross-section |
| 54. | Another spacecraft |

The invention claimed is:

1. A Hold Down Release Mechanism (HDRM) interface for attachment of a spacecraft to an adjacent structure of a launch vehicle or to an adjacent structure of another spacecraft carried by the launch vehicle, wherein the HDRM interface is configured for forming part of a single-point or multi-point releasable attachment of the spacecraft to said adjacent structure, the HDRM interface comprising:

a first connector part and a second connector part, wherein one of the first and second connector parts is configured to be fastened to said adjacent structure, and the other of the first and second connector parts is configured to be fastened to the spacecraft, wherein the first connector part has a tapered projection with a non-circular external surface in a plane perpendicular to a release direction of the HDRM interface, wherein the second connector part has a matching formed tapered recess with a non-circular interior surface configured for form-lockingly receiving the tapered projection, for enabling transfer of at least torsion load and shear load between the first and second connector parts, when the tapered projection is inserted in the tapered recess and the first and second connector parts are pressed together, wherein the tapered projection of the first connector part has the shape of a truncated or non-truncated substantially triangular pyramid, and the tapered recess of the second connector part has the shape of a truncated or non-truncated inverse substantially triangular pyramid, wherein an exterior outline of a cross-section of the tapered projection of the first connector part, in a plane perpendicular to a release direction of the HDRM interface, has three substantially straight lateral sides with substantially equal length, and wherein both the tapered projection of the first connector part and the tapered recess of the second connector part have a central through-hole for receiving a release bolt configured to clamp the first and second connector parts together.

2. The HDRM interface according to claim 1, wherein a lateral surface area of the tapered projection of the first connector part is defined by a set of substantially flat lateral sides mutually connected via sharp or rounded or bevelled lateral edges, and wherein a lateral surface area of the tapered recess of the second connector part is defined by a set of substantially flat lateral sides mutually connected via sharp or rounded or bevelled lateral edges.

3. The HDRM interface according to claim 1, wherein the tapered projection of the first connector part has a shape of truncated or non-truncated pyramid with odd number of main lateral sides, and the tapered recess of the second connector part has the shape of an inverse truncated or non-truncated pyramid with odd number of main lateral sides.

4. The HDRM interface according to claim 3, wherein the tapered projection of the first connector part has the shape of a truncated triangular pyramid, and the tapered recess of the second connector part has the shape of a truncated inverse triangular pyramid.

5. The HDRM interface according to claim 1, wherein an exterior outline of a cross-section of the tapered projection of the first connector part, in a plane perpendicular to a release direction of the HDRM interface, has three substantially straight lateral sides that are mutually connected by sharp or at least one of rounded or bevelled lateral edges.

6. The HDRM interface according to claim 1, wherein an exterior outline of a cross-section of the tapered recess of the second connector part, in a plane perpendicular to a release direction of the HDRM interface, has three substantially straight lateral sides that are mutually connected by at least one of rounded or bevelled lateral edges.

7. The HDRM interface according to claim 1, wherein an effective minimal contact length of a straight lateral side of an exterior outline of a cross-section of the tapered projection of the first connector part, in a plane perpendicular to a release direction of the HDRM interface, is at least 50% of a length of oppositely facing straight lateral side of the tapered recess of the second connector part, in said plane.

8. The HDRM interface according to claim 1, wherein an effective minimal total contact length of an exterior outline of a cross-section of the tapered projection of the first connector part, in a plane perpendicular to a release direction of the HDRM interface, is at least 50% of a length of oppositely facing interior outline of a cross-section of the tapered recess of the second connector part, in said plane.

9. The HDRM interface according to claim 1, wherein an exterior surface of a substantially flat lateral side of the tapered projection of the first connector part define a tapering angle, relative to a release direction of the HDRM interface, in the range of 5-45°.

10. The HDRM interface according to claim 1, wherein each of the first and second connector parts has an attachment flange for attachment to the said adjacent structure and spacecraft, respectively, wherein the attachment flange of each connector part has a plurality of holes for receiving fasteners.

11. The HDRM interface according to claim 1, wherein the non-circular external surface of the tapered projection of the first connector part, and the matching formed tapered recess of the second connector part, jointly provides a play-free connection between the first and second connector parts, when the tapered projection is inserted in the tapered recess and the first and second connector parts are pressed together by a release bolt.

12. A launch vehicle carrying a first spacecraft, which is releasably attached to an adjacent structure of the launch vehicle or to an adjacent structure of a second spacecraft carried by the launch vehicle by means of a singular or plurality of HDRM interfaces in a single-point or multi-point attachment of the first spacecraft for enabling controlled release of the first spacecraft, wherein each of the singular or plurality of HDRM interfaces is defined according to claim 1, wherein one of the first and second connector parts of each of the singular or plurality of HDRM interfaces is fastened to the said adjacent structure, and the other of the first and second connector parts of each of the singular or plurality of HDRM interfaces is fastened to the first spacecraft, and wherein a release bolt extends through the central through-hole of the first and second connector parts of each of the singular or plurality of HDRM interfaces and clamps said first and second connector parts together.

13. A method for mounting a first spacecraft to an adjacent structure of a launch vehicle or of a second spacecraft using a singular or plurality of Hold Down Release Mechanism (HDRM) interfaces forming part of a single-point or multi-point attachment of the first spacecraft to said adjacent structure, the method comprising:
  providing a singular or plurality of HDRM interfaces, each having a first connector part having a tapered projection with a non-circular external surface in a plane perpendicular to a release direction of the singular or plurality of HDRM interfaces and a central through-hole, and a second connector part having a matching formed tapered recess with a non-circular interior surface configured for form-lockingly receiving the tapered projection, for enabling transfer of at least torsion load and shear load between the first and second connector parts, when the tapered projection is inserted in the tapered recess and the first and second connector parts are pressed together, wherein the tapered projection of the first connector part has the shape of a truncated or non-truncated substantially triangular pyramid, and the tapered recess of the second connector part has the shape of a truncated or non-truncated inverse substantially triangular pyramid, wherein an exterior outline of a cross-section of the tapered projection of the first connector part, in a plane perpendicular to a release direction of the HDRM interface, has three substantially straight lateral sides with substantially equal length, and wherein also the second connector part has central through-hole;
  providing a singular or plurality of release bolts and inserting a release bolt through the central through hole of the first and second connector parts of each of the singular or plurality of HDRM interfaces and clamping the first and second connector parts together by means of said release bolt to form a singular or plurality of assembled HDRM interfaces; and
  attaching one of the first and second connector parts of the singular or plurality of HDRM interfaces to said adjacent structure and attaching the first spacecraft to the other of the first and second connector parts of the singular or plurality of HDRM interfaces.

* * * * *